US012461469B2

(12) United States Patent
Ito et al.

(10) Patent No.: US 12,461,469 B2
(45) Date of Patent: Nov. 4, 2025

(54) IMAGE FORMING APPARATUS IN WHICH INITIAL DEVELOPER IS FILLED IN ADVANCE

(71) Applicant: CANON KABUSHIKI KAISHA, Tokyo (JP)

(72) Inventors: Motonari Ito, Shizuoka (JP); Seiichi Shinohara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/732,774

(22) Filed: Jun. 4, 2024

(65) Prior Publication Data

US 2024/0419099 A1 Dec. 19, 2024

(30) Foreign Application Priority Data

Jun. 19, 2023 (JP) ................................ 2023-100406
Jul. 27, 2023 (JP) ................................ 2023-122709

(51) Int. Cl.
*G03G 15/08* (2006.01)
*G03G 9/097* (2006.01)
(Continued)

(52) U.S. Cl.
CPC ..... *G03G 15/0865* (2013.01); *G03G 9/09725* (2013.01); *G03G 9/09775* (2013.01);
(Continued)

(58) Field of Classification Search
CPC ........... G03G 15/0865; G03G 9/09725; G03G 9/09775; G03G 15/0877; G03G 15/0891;
(Continued)

(56) References Cited

U.S. PATENT DOCUMENTS 4,470,689 A * 9/1984 Nomura ............. G03G 21/1832 355/71
5,411,827 A 5/1995 Tamura et al.
(Continued)

FOREIGN PATENT DOCUMENTS

JP 2-198456 A 8/1990
JP 2000-66425 A 3/2000
(Continued)

*Primary Examiner* — Stephanie E Bloss
*Assistant Examiner* — Laura Roth
(74) *Attorney, Agent, or Firm* — Venable LLP

(57) ABSTRACT

An image forming apparatus includes a rotatable image bearing member, a charging member, a developing unit, a cleaning member, and a supply container. In an accommodating portion of a new developing unit, an initial developer which is a developer in a predetermined amount is filled in advance. The initial developer contains toner particles of which charge polarity is a predetermined polarity, and to the toner particles of the initial developer, lubricant particles of a polarity opposite in charge polarity to the predetermined polarity are externally added. A supply developer which is the developer accommodated in the supply container contains the toner particles. An external addition amount of the lubricant particles to the toner particles in the supply developer is smaller than an external addition amount of the lubricant particles to the toner particles in the initial developer.

4 Claims, 12 Drawing Sheets

(51) Int. Cl.

| | |
|---|---|
| ***G03G 15/00*** | (2006.01) |
| ***G03G 21/00*** | (2006.01) |
| ***G03G 21/18*** | (2006.01) |

(52) U.S. Cl.

CPC ..... *G03G 15/0877* (2013.01); *G03G 15/0891* (2013.01); *G03G 15/5008* (2013.01); *G03G 21/0005* (2013.01); *G03G 21/18* (2013.01); *G03G 2215/00957* (2013.01); *G03G 2215/0604* (2013.01)

(58) Field of Classification Search

CPC ........... G03G 15/5008; G03G 21/0005; G03G 21/18; G03G 2215/00957; G03G 2215/0604; G03G 15/75

See application file for complete search history.

(56) References Cited

U.S. PATENT DOCUMENTS

| | | | | |
|---|---|---|---|---|
| 5,496,671 | A | 3/1996 | Tamura et al. | |
| 5,776,648 | A * | 7/1998 | Ikami | G03G 13/09 430/119.86 |
| 5,888,684 | A * | 3/1999 | Kobayashi | G03G 5/142 430/65 |
| 6,180,303 | B1 | 1/2001 | Uematsu et al. | |
| 7,078,142 | B2 | 7/2006 | Itami et al. | |
| 9,778,583 | B2 | 10/2017 | Terauchi et al. | |
| 10,025,210 | B2 | 7/2018 | Tanabe et al. | |
| 2001/0021322 | A1 * | 9/2001 | Tsuruya | G03G 15/0126 399/302 |
| 2002/0076238 | A1 | 6/2002 | Itami et al. | |
| 2006/0182466 | A1 * | 8/2006 | Oda | G03G 21/0005 399/253 |
| 2006/0204877 | A1 * | 9/2006 | Kuroyama | G03G 9/09725 430/108.7 |
| 2012/0093527 | A1 * | 4/2012 | Itagaki | G03G 15/0893 399/27 |
| 2015/0293473 | A1 * | 10/2015 | Sakamaki | G03G 15/0877 399/258 |
| 2018/0299810 | A1 * | 10/2018 | Miura | G03G 15/0865 |
| 2018/0329330 | A1 | 11/2018 | Era et al. | |

FOREIGN PATENT DOCUMENTS

| | | | |
|---|---|---|---|
| JP | 2001-5207 | A | 1/2001 |
| JP | 3194392 | B2 | 7/2001 |
| JP | 2001-312132 | A | 11/2001 |
| JP | 2008-83186 | A | 4/2008 |
| JP | 2016-38591 | A | 3/2016 |
| JP | 2017-198946 | A | 11/2017 |
| JP | 2017-219583 | A | 12/2017 |
| JP | 2018-189922 | A | 11/2018 |
| JP | 2023-83678 | A | 6/2023 |

* cited by examiner

IMAGE FORMING APPARATUS IN WHICH INITIAL DEVELOPER IS FILLED IN ADVANCE

FIELD OF THE INVENTION AND RELATED ART

The present invention relates to an image forming apparatus, such as a copying machine, a printer, or a facsimile machine, using an electrophotographic type or an electrostatic recording type, and relates to a supply container in which a developer supplied to a developing device of this image forming apparatus is accommodated.

Conventionally, for example, the image forming apparatus, such as the printer, using the electrophotographic type performs image recording in the following manner. First, a surface of a photosensitive member is electrically charged uniformly by a charging device, and the charged surface of the photosensitive member is selectively exposed to light, so that an electrostatic latent image is formed on the photosensitive member. Thereafter, a toner image is formed on the photosensitive member by supplying toner to the electrostatic latent image on the photosensitive member by the developing device, and then, this toner image is transferred onto a recording material. Further, after the toner image is transferred onto the recording material, toner (transfer residual toner) remaining on the photosensitive member is removed from the surface of the photosensitive member by a cleaning device before the surface of the photosensitive member is charged again by the charging device. The developing device is, in general, includes a developer carrying member for carrying and conveying the device toward the photosensitive member and a regulating member which is provided so as to contact the developer carrying member and which is for not only regulating a layer thickness of a developer carried on a developing roller but also charging the developer. As the developer carrying member, the developing roller is used in many instances, and as the regulating member, a developing blade is used in many instances. Further, as the cleaning device, a device for scraping off the transfer residual toner from the surface of the rotating photosensitive member by a cleaning member provided so as to contact the surface of the photosensitive member has been used widely.

As the photosensitive member, from advantages of low cost and high productivity, an organic photosensitive member becomes widespread. The organic photosensitive member is constituted by providing, on a supporting member, a photosensitive layer (organic photosensitive layer) using an organic material as a photoconductive substance (charge generating substance), charge transporting substance). As the organic photosensitive member, from advantages of high sensitivity and diversity of material design, a photosensitive member including a lamination-type photosensitive layer goes mainstream. This photosensitive member is constituted by laminating a charge generating layer containing the charge generating substance such as a photoconductive dye or a photoconductive pigment and a charge transporting layer containing the charge transporting substance such as a photoconductive polymer or a photoconductive low-molecular weight compound.

To the surface of the photosensitive member, electrical external forces and mechanical external forces are directly applied in steps of charging, exposure, development, transfer, and cleaning. For that reason, the photosensitive member is required to have resistance to these external forces. Specifically, the photosensitive member is required to have durability, i.e., scratch resistance and wear resistance, to generation of scars and abrasion of the surface of the photosensitive member due to the external forces.

As a technique for improving the scratch resistance and the wear resistance of the surface of the organic photosensitive member, the following photosensitive members and the like are known. A photosensitive member in which a cured layer using a curable resin as a binder resin is used as a surface layer is known. Further, a photosensitive member in which a charge transporting cured layer formed by subjecting a monomer having C—C double bond and a charge transporting monomer having C—C double bond to curing polymerization by heat or light energy is used as the surface layer is known in Japanese Patent No. 3194392. Further, a photosensitive member in which a charge transporting cured layer formed by subjecting a hole transporting compound having a chain polymerization functional group in the same molecule to curing polymerization by electron beam energy is used as the surface layer is known in Japanese Laid-Open Patent Application (JP-A) No. 2000-66425. Further, a photosensitive member including a wear resistant protective layer (over coat layer: OCL) as a surface layer thereof is known in JP-A No. 2001-5207.

On the other hand, when the wear resistance of the surface of the photosensitive member is improved, the photosensitive member surface is not readily abraded, and therefore, it is known that a frictional force between the photosensitive member and the cleaning member increases. By this increase in frictional force, there is a possibility of increases in size and cost of the image forming apparatus in order to cope with a load of an increase in torque for rotating the photosensitive member. Further, by this increase in frictional force, in the case where the cleaning member is deteriorated, there is a possibility that contamination of a charging roller widely used as the charging device occurs and leads to an image defect.

Therefore, as one of methods for supplying a lubricant to the surface of the photosensitive member, a method in which an external additive (lubricant particles) having a lubricating property are contained in the developer is proposed in JP-A No. 2017-198946. Particularly, in the case of a low print ratio, on the surface of the photosensitive member, a white background portion (non-image portion) to which toner particles are not supplied increases, and therefore, a torque for rotating the photosensitive member is liable to increase. For that reason, it is effective that lubricant particles of a charge polarity opposite to a charge polarity of the toner particles are externally added to the toner particles. In this case, the lubricant particles liberated from the toner particles are supplied to the white background portion (non-image portion) of the surface of the photosensitive member. Then, the lubricant particles of the charge polarity opposite to the charge polarity of the toner particles are not transferred onto the recording material at a transfer portion, and therefore, are easily supplied to a contact portion between the photosensitive member and the cleaning member.

Further, in a state in which toner in the developing device becomes small in amount and in which the above-described toner and external additive are contained in the developing device, when a toner cartridge is exchanged with a new toner cartridge for supplying toner, the toner different in state are present in mixture. Therefore, in JP-A No. 2008-83186, a constitution in which an external additive having the same composition for the toner filled in a process cartridge is added into the toner cartridge is described. In JP-A No. 2008-83186, in addition, a constitution in which the toner filled in the toner cartridge is made smaller in BET specific surface area of the toner than the toner filled in the process cartridge is proposed.

However, the lubricant particles opposite in polarity to the above-described toner particles are liable to move in a direction opposite to a movement direction of the toner particles in the developing device. For that reason, fusion of the lubricant particles onto a developing blade occurs in some instances. Then, when a lump of the lubricant particles fused on this developing blade grows, toner coat(ing) on the developing roller is disordered, so that there is a possibility that an image defect in a vertical stripe shape (stripe shape extending in a direction along a movement direction of the surface of the developing roller) occurs.

Here, the developing device is constituted, singly as an independent unit or as a part of a process cartridge, in some cases so as to be detachably mountable to an apparatus main assembly of the image forming apparatus. The process cartridge is prepared by integrally assembling a photosensitive member and, as a process means actable on the photosensitive member, a charging device, a developing device, a cleaning device, and the like into a unit structure, which is made detachably mountable to the apparatus main assembly of the image forming apparatus. By employing such a constitution, toner supply or exchanged and maintenance of various parts such as the photosensitive member which reaches an end of a lifetime thereof are made easy. Further, in order to meet with lifetime extension of the developing device and the process cartridge, a type in which toner is supplied from a toner cartridge detachably mountable to the developing device or the process cartridge to the developing device is employed in some cases. For example, lifetime extension of the photosensitive member advances, and therefore, only a toner container high in exchange frequency is separated from the process cartridge and then is constituted as a toner cartridge in some instances.

However, in the case where the toner is supplied from such a toner cartridge to the developing device, when the toner cartridge is repetitively exchanged for a single developing device, many lubricant particles are supplied to the developing blade. As a result, fusion of the lubricant particles onto the developing blade is liable to occur, so that there is a possibility that the fusion constitutes a factor hindering the lifetime extension of the developing device and the process cartridge.

Further, in the case where for example, a plurality of external additives are added to the toner used in image formation, when the toner cartridge is exchanged with a new toner cartridge depending on use, image failure occurs in some instances.

SUMMARY OF THE INVENTION

Accordingly, a principal object of the present invention is to suppress image failure with supply of a developer in a constitution in which a supply container in which the developer to be supplied to a developing device is accommodated is detachably mountable to the developing device.

This object is accomplished by an image forming apparatus according to the present invention and a developing container in the present invention.

According to an aspect of the present invention, there is provided an image forming apparatus comprising: a rotatable image bearing member; a charging member configured to electrically charge a surface of the image bearing member; a developing unit configured to form a developer image by supplying a developer to the surface of the image bearing member charged by the charging member, the developing unit including a rotatable developing member configured to convey the developer toward the image bearing member while carrying the developer, a regulating member configured to regulate an amount of the developer on the developing member in contact with the developing member, and an accommodating portion configured to accommodate the developer supplied to the developing member; a cleaning member configured to remove the developer from the surface of the image bearing member in contact with the surface of the image bearing member; and a supply container detachably mountable to the developing unit and configured to accommodate the developer supplied to the accommodating portion of the developing unit, the supply container being capable of being demounted from the developing unit after the developer is supplied from the supply container to the accommodating portion of the developing unit and then being exchanged, wherein in the accommodating portion of a new developing unit, an initial developer which is the developer in a predetermined amount is filled in advance, wherein the initial developer contains toner particles of which charge polarity is a predetermined polarity, and to the toner particles of the initial developer, lubricant particles of a polarity opposite in charge polarity to the predetermined polarity are externally added, wherein a supply developer which is the developer accommodated in the supply container contains the toner particles, and wherein an external addition amount of the lubricant particles to the toner particles in the supply developer is smaller than an external addition amount of the lubricant particles to the toner particles in the initial developer.

According to another aspect of the present invention, there is provided an image forming apparatus comprising: a rotatable image bearing member; a charging member configured to electrically charge a surface of the image bearing member; a developing unit configured to form a developer image by supplying a developer to the surface of the image bearing member charged by the charging member, the developing unit including a rotatable developing member configured to convey the developer toward the image bearing member while carrying the developer, a regulating member configured to regulate an amount of the developer on the developing member in contact with the developing member, and an accommodating portion configured to accommodate the developer supplied to the developing member; and a cleaning member configured to remove the developer from the surface of the image bearing member in contact with the surface of the image bearing member, wherein the developing unit is capable of being continuously used even after the developer in an amount corresponding to the predetermined amount is consumed, by supplying the developer to the accommodating portion, wherein in the accommodating portion of a new developing unit, an initial developer which is the developer in a predetermined amount is filled in advance, wherein the initial developer contains toner particles of which charge polarity is a predetermined polarity, and to the toner particles of the initial developer, lubricant particles of a polarity opposite in charge polarity to the predetermined polarity are externally added, wherein a supply developer which is the developer accommodated in the developing unit contains the toner particles, and wherein an external addition amount of the lubricant particles to the toner particles in the supply developer is smaller than an external addition amount of the lubricant particles to the toner particles in the initial developer.

According to a further aspect of the present invention, there is provided an image forming apparatus comprising: a rotatable image bearing member; a charging member configured to electrically charge a surface of the image bearing member; a developing unit configured to form a developer image by supplying a developer to the surface of the image bearing member charged by the charging member, the developing unit including a rotatable developing member carrying the developer on a surface thereof, and an accommodating portion configured to accommodate the developer supplied to the developing member; and a supply container detachably mountable to the developing unit and capable of accommodating a supply developer as the developer and supplying the supply developer to the accommodating portion of the developing unit, wherein in the accommodating portion of a new developing unit, an initial developer which is the developer in a predetermined amount is filled in advance, wherein each of the initial developer and the supply developer contains at least toner particles, a first external additive, and a second external additive, wherein an amount of the first external additive contained in the initial developer is defined as I1, an amount of the first external additive contained in the supply developer is defined as H1, an amount of the second external additive contained in the initial developer is defined as I2, an amount of the second external additive contained in the supply developer is defined as H2, and coverage ratios as measured by ESCA are defined as Wpa for the first external additive in the initial developer, Wta for the first external additive in the supply developer, Wpb for the second external additive in the initial developer, and Wtb for the second external additive in the supply developer, and wherein the following relationships are satisfied: $0.9<H1/I1<1.1$, $0.9<H2/I2<1.1$, $Wta<Wpa$, and $Wtb<Wpb$.

Further features of the present invention will become apparent from the following description of exemplary embodiments with reference to the attached drawings.

DESCRIPTION OF THE EMBODIMENTS

In the following, an image forming apparatus and a supply (replenishment) container according to the present invention will be specifically described with reference to the drawings.

<General Structure and Operation of Image Forming Apparatus>

Figure 1:
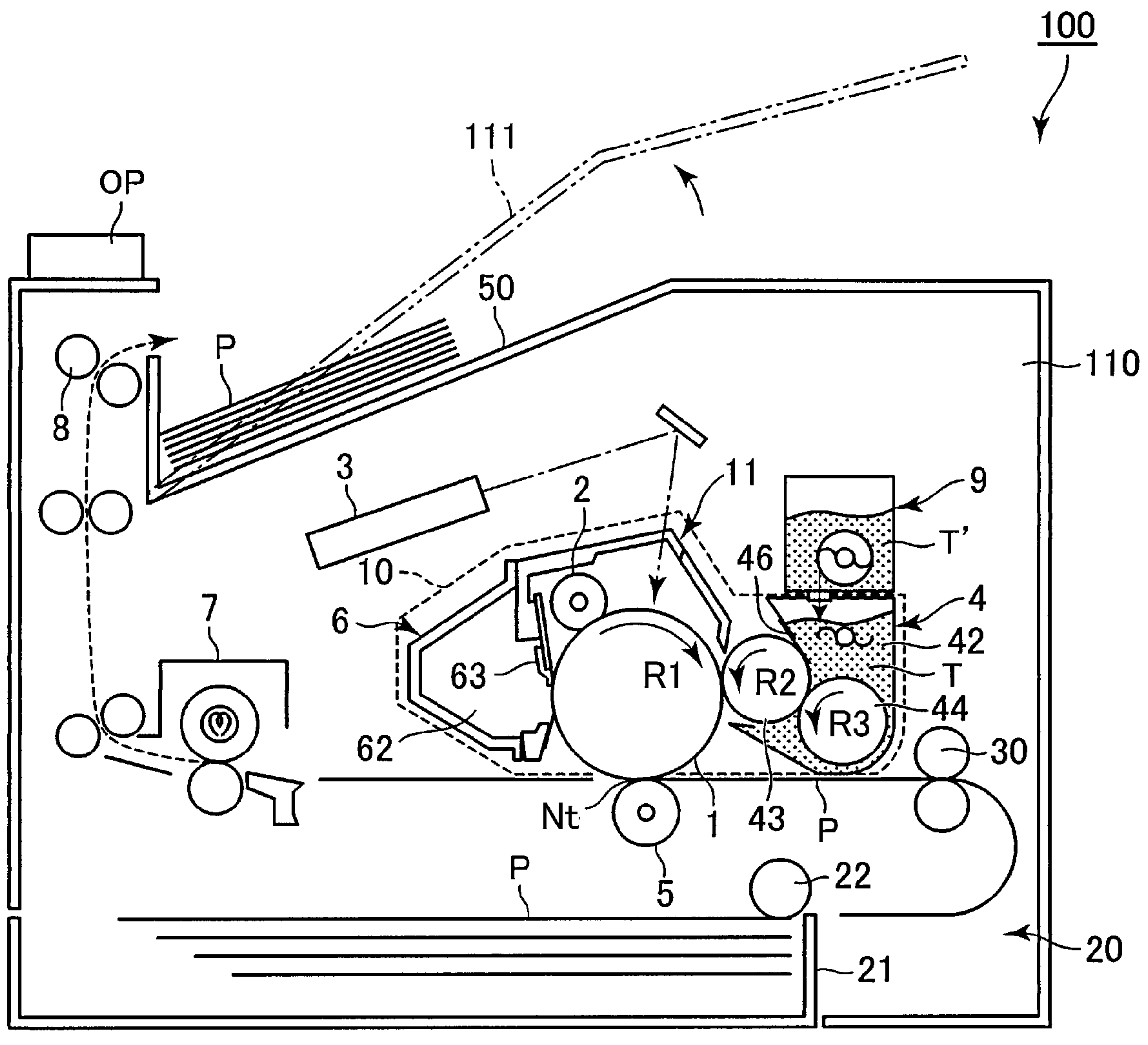
FIG. 1 is a schematic sectional view of an image forming apparatus.

FIG. 1 is a schematic sectional view of an image forming apparatus 100 of an embodiment. The image forming apparatus 100 of this embodiment is a monochromatic laser printer capable of forming a black (monochromatic) image on a sheet-like recording material P with use of an electrophotographic type.

In this embodiment, to the image forming apparatus 100, a process cartridge 10 is mounted so as to be detachably mountable to an apparatus main assembly 110. The process cartridge 10 is easily detachably mountable to the apparatus main assembly 110 via a mounting means (not shown), such as a mounting guide or a positioning member, provided in the apparatus main assembly 110 and on the process cartridge 10. Further, in this embodiment, to the image forming apparatus 100, a toner cartridge 9 as a toner supply container (developer supply container, developer replenishment container) is mounted so as to be detachably mountable to the apparatus main assembly 110 and the process cartridge 10. The toner cartridge 9 is easily detachably mountable in the apparatus main assembly 110 and on the process cartridge 10 via the mounting guide (not shown), such as the mounting guide or the positioning member, provided in the apparatus main assembly 110 and on the process cartridge 10. Incidentally, the apparatus main assembly 110 is a constituent portion excluding the process cartridge 10 and the toner cartridge 9 in the image forming apparatus 100. Each of the toner cartridge 9 and the process cartridge 10 is mounted to and demounted from the apparatus main assembly 110 by opening a top cover 111 provided openably and closably at an upper portion of the apparatus main assembly 110.

The process cartridge 10 includes a photosensitive drum 1 which is a rotatable drum-type (cylindrical) photosensitive member (electrophotographic photosensitive member) as an image bearing member, and includes a charging roller 2 which is a roller-type charging member as a charging means (charging device). In addition, the process cartridge 10 includes a developing device 4 as a developing means, and a cleaning device 6 as a cleaning means. Above the process cartridge 10 in the apparatus main assembly 110, an exposure device (scanner unit) 3 as an exposure means is provided.

During an image forming operation, the photosensitive drum 1 is rotationally driven in an arrow R1 direction (clockwise direction) in FIG. 1 at a predetermined process speed (peripheral speed). A surface of a rotating photosensitive drum 1 is electrically charged uniformly to a predetermined polarity (negative polarity in this embodiment) and a predetermined potential by the charging roller 2. During the charging, to the charging roller 2, a predetermined charging voltage (charging bias) is applied. The charged surface of the photosensitive drum 1 is selectively exposed to light (scanning exposure) depending on image information (image signal) by the exposure device 3, so that an electrostatic latent image (electrostatic image) depending on the image information is formed on the photosensitive drum 1. The electrostatic latent image formed on the photosensitive drum 1 is developed (visualized) by being supplied with toner as a developer by the developing device 4, so that a toner image (developer image) depending on the image information is formed on the photosensitive drum 1. During the development, to a developing roller 43 provided in the developing device 4, a predetermined developing voltage (developing bias) is applied. In this embodiment, the toner charged to the same polarity (negative polarity in this embodiment) as a charge polarity of the photosensitive drum 1 is deposited on the photosensitive drum 1 at an exposure portion (image portion) lowered in absolute value of a potential by being exposed to light after being charged uniformly (reverse development type). In this embodiment, a normal charge polarity (normal polarity) of the toner which is a principal charge polarity of the toner, specifically toner particles 45*a* (FIG. 4) described later, during development is the negative polarity.

Opposed to the photosensitive drum 1, a transfer roller 5 which is a roller-type transfer member as a transfer means is provided. The transfer roller 5 is pressed toward the photosensitive drum 1, and forms a transfer portion (transfer position, transferring) Nt which is a contact portion between the photosensitive drum 1 and the transfer roller 5. The toner image formed on the photosensitive drum 1 is transferred in the transfer portion Nt onto a recording material P as a toner image receiving member nipped and conveyed by the photosensitive drum 1 and the transfer roller 5. To the transfer roller 5, an unshown a transfer power source (high-voltage power source) as a transfer voltage applying means provided in the apparatus main assembly 110 is connected. During the transfer, to the transfer roller 5, from the transfer power source, a predetermined transfer voltage (transfer bias) which is a DC voltage of a polarity (positive polarity in this embodiment) opposite to the normal charge polarity of the toner, specifically the toner particles 45*a*, is applied. The recording material (transfer material, recording medium, sheet) P such as recording paper, an OHP sheet, or a cloth is fed from a feeding portion 20 toward the transfer portion Nt.

The feeding portion 20 is constituted by a cassette 21 as a recording material accommodating portion, a feeding roller 22 as a feeding member, and the like. The recording material P accommodated in the cassette 21 is separated and fed one by one from the cassette 21 by the feeding roller 22 or the like. This recording material P is conveyed toward the transfer portion Nt by being timed to the toner image on the photosensitive drum 1 by a registration roller pair 30 as a conveying member.

The recording material P on which the toner image is transferred is conveyed to a fixing device 7 as a fixing means. The fixing device 7 fixes (melts, sticks) the toner image on the recording material P by heating and pressing the recording material P carrying thereon the unfixed toner image. The recording material P on which the toner image is fixed is discharged (outputted) onto a tray 50 as a discharge portion, provided at an upper portion of the apparatus main assembly 110, by a discharging roller 8 or the like as a conveying member.

On the other hand, toner remaining on the photosensitive drum 1 without being transferred onto the recording material P during the transfer (transfer residual toner) is removed and collected from the photosensitive drum 1 by the cleaning device 6.

<Process Cartridge>

Figure 2:
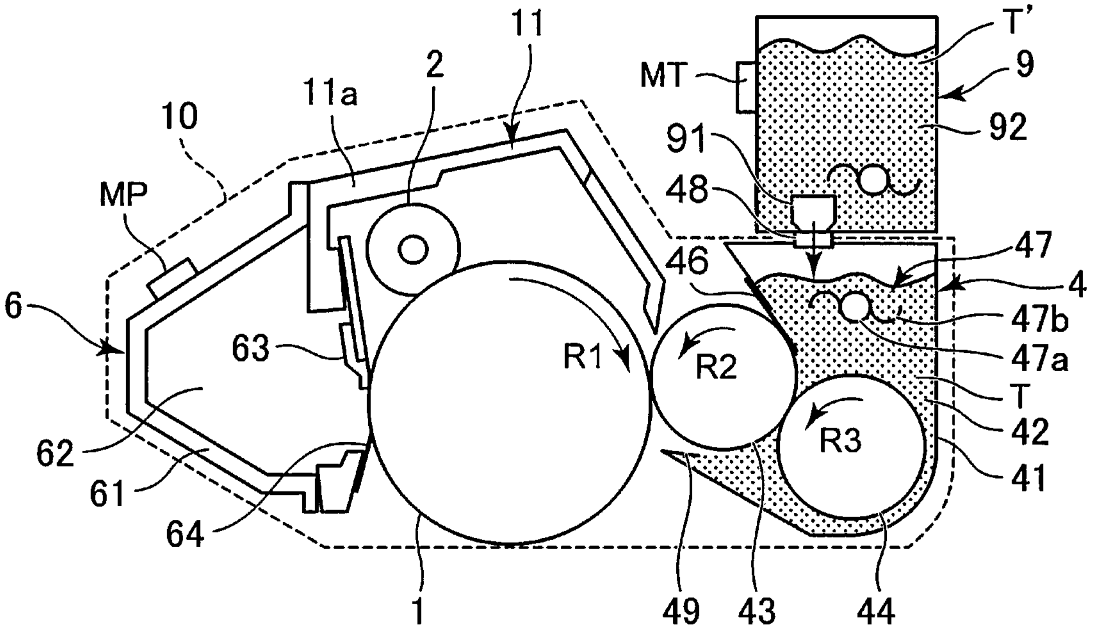
FIG. 2 is a schematic sectional view of a process cartridge and a toner cartridge.

Next, the process cartridge 10 in this embodiment will be further described. FIG. 2 is a schematic sectional view of the process cartridge 10 in this embodiment. Incidentally, in FIG. 2, the toner cartridge 9 is also shown.

The process cartridge 10 includes a drum unit (photosensitive member voltage) 11 and the developing device (developing unit) 4. The drum unit 11 and the developing device 4 are connected to each other, and constitute the process cartridge 10 integrally detachably mountable to the apparatus main assembly 110.

The drum unit 11 includes the photosensitive drum 1, the charging roller 2, and the cleaning device 6. The photosensitive drum 1 is rotatably mounted to a drum unit frame 11*a*. To the surface (outer peripheral surface) of the photosensitive drum 1, the charging roller 2 and a cleaning member 63 of the cleaning device 6 are contacted. To the photosensitive drum 1, a driving force is transmitted from a driving motor (not shown) as a driving source constituting a driving means provided in the apparatus main assembly 110, so that the photosensitive drum 1 is rotationally driven in an arrow R1 direction (clockwise direction) in FIG. 2 at a predetermined process speed (peripheral speed).

The cleaning device 6 includes a cleaning container (cleaning frame) 61 constituting a part of the drum unit frame 11*a*. Inside the cleaning container 61, a removed toner chamber 62 for accommodating transfer residual toner removed from the photosensitive drum 1 is formed. To the cleaning container 61, the cleaning member 63 is mounted. The cleaning member (cleaning blade) 63 is constituted by including a rubber blade which is a plate-like member formed of a rubber as an elastic member, and a cleaning (blade) supporting member for supporting the rubber blade. The rubber blade is a plate-like member which has a predetermined length in each of a longitudinal direction substantially perpendicular to a rotational axis direction of the photosensitive drum 1 and a widthwise (short) direction substantially perpendicular to this longitudinal direction and which has a predetermined thickness. The cleaning member 63 is disposed in contact with the surface of the photosensitive drum 1 so that the rubber blade is directed in a counter direction (direction in which a free end portion thereof is directed to an upstream side of a rotational direction of the photosensitive drum 1) to a rotational direction of the photosensitive drum 1. The cleaning device 6 scrapes off the transfer residual toner from the surface of the rotating photosensitive drum 1 by the cleaning member 63, and collects the transfer residual toner by dropping the transfer residual toner into the removed toner chamber 62. Further, to the cleaning container 61, a scooping sheet 64 for preventing leakage of the toner from the removed toner chamber 62 is mounted. The scooping sheet 64 is disposed in contact with the surface of the photosensitive drum 1 on a side upstream of the cleaning member 63 with respect to the rotational direction of the photosensitive drum 1.

The charging roller 2 is rotatably mounted to the drum unit frame 11*a*. The charging roller 2 is disposed in contact with the surface of the photosensitive drum 1 and is pressed toward the photosensitive drum 1 by a pressing member (not shown), so that the charging roller 2 is rotated with rotation of the photosensitive drum 1. Further, during the charging, to the charging roller 2, a predetermined charging voltage (charging bias) is applied from an unshown charging power source (high-voltage power source) as a charging voltage applying means provided in the apparatus main assembly 110. By this, a uniform dark-portion potential (Vd) is formed on the surface of the photosensitive drum 1. Further, the surface of the photosensitive drum 1 is exposed to light by a spot pattern of laser light emitted from the above-described exposure device 3 correspondingly to the image data. At a portion of the surface of the photosensitive drum 1 exposed to light, a surface electric charge disappears by a carrier from a carrier generating layer, so that an absolute value of the potential lowers. As a result, on the photosensitive drum 1, an electrostatic latent image which has a predetermined light-portion potential (Vl) at the exposed portion and a predetermined dark-portion potential (Vd) at an unexposed portion. In this embodiment, Vd was −500 V, and Vl was −100 V.

On the other hand, the developing device (developing unit) 4 includes the developing container (developing frame)

41. Inside the developing container 41, a toner accommodating chamber 42 as an accommodating portion for accommodating toner T is formed. In this embodiment, in the toner accommodating chamber 42, a non-magnetic one-component developer (toner) T as the developer is accommodated. To the developing container 41, the developing roller 43 as a developer carrying member (developing member) and a supplying roller 44 as a supplying member are rotatably mounted. The developing roller 43 carries and conveys the toner T and thus supplies the toner T to the photosensitive drum 1 depending on the electrostatic latent image on the photosensitive drum 1. The supplying roller 44 supplies the toner T to the developing roller 43. Further, to the developing container 41, a developing blade 46 as a regulating member is mounted. The developing blade 46 not only regulates a toner amount of a toner layer on the developing roller 43 but also triboelectrically charges the toner T. Further, to the developing container 41, a blowing-out preventing sheet 49 is mounted. In addition, to the developing container 41, a stirring member 47 is rotatably mounted.

The developing roller 43 is disposed in contact with the surface of the photosensitive drum 1, and to which a driving force is transmitted from a driving motor (not shown) as a driving source constituting a driving means provided in the apparatus main assembly 110, so that the developing roller 43 is rotationally driven in an arrow R2 direction (counterclockwise) direction in FIG. 2. Further, the supplying roller 44 is disposed in contact with the developing roller 43, and to which a driving force is transmitted from a driving motor (not shown) as a driving source constituting a driving means provided in the apparatus main assembly 110, so that the supplying roller 44 is rotationally driven in an arrow R3 direction (counterclockwise direction) in FIG. 2. Further, the developing blade 46 is a plate-like member which has a predetermined length in each of a longitudinal direction substantially parallel to a rotational axis direction of the developing roller 43 and a widthwise (short) direction substantially perpendicular to the longitudinal direction and which has a predetermined thickness. The developing blade 46 is formed of electroconductive metal as an elastic member. Further, the developing blade 46 is disposed in contact with the developing roller 43 at a surface thereof, opposing the developing roller 43, in the neighborhood of a free end portion thereof so that the free end portion with respect to the widthwise direction is directed toward an upstream side of the rotational direction of the developing roller 43.

When the toner supplied to the developing roller 43 by the supplying roller 44 passes through a contact portion between the developing blade 46 and the developing roller 43, not only an amount of the toner on the developing roller 43 (toner coat amount) is regulated, but also the toner is triboelectrically charged. By this, a toner coat suitable for developing the electrostatic latent image formed on the photosensitive drum 1 is formed on the developing roller 43. Each of the developing roller 43 and the photosensitive drum 1 is rotated, so that in a developing portion which is an opposing portion (contact portion) between the developing roller 43 and the photosensitive drum 1, surfaces of these roller and drum move in the same direction (direction from above toward below in this embodiment).

In this embodiment, during the development, to each of the developing roller 43, the supplying roller 44, and the developing blade 46, an independent voltage is applied from a high-voltage power source (not shown). That is, to the developing roller 43, a predetermined developing voltage (developing bias) is applied from a developing power source (not shown) as a developing voltage applying means provided in the apparatus main assembly 110. Further, to the supplying roller 44, a predetermined supplying voltage (supplying bias) is applied from a supplying power source (not shown) as a supplying voltage applying means provided in the apparatus main assembly 100. Further, to the developing blade 46, a predetermined regulating voltage (regulating bias) is applied from a regulating power source (not shown) as a regulating voltage applying means provided in the apparatus main assembly 100. In this embodiment, during the development, to the developing roller 43, a predetermined developing voltage which is a DC voltage (DC bias) of the same polarity (negative polarity in this embodiment) as the normal charge polarity of the toner, specifically the toner particles 45*a*, is applied. Further, in this embodiment, during the development, to the supplying roller 44, a predetermined supplying voltage which is a DC voltage (DV bias) of the same polarity (negative polarity in this embodiment) as the normal charge polarity of the toner, specifically the toner particles 45*a*, and higher in absolute value than the developing voltage is applied. Further, in this embodiment, during the development, to the developing blade 46, a predetermined regulating voltage which is a DC voltage (DC bias) of the same polarity (negative polarity in this embodiment) as the normal charge polarity of the toner, specifically the toner particles 45*a*, and higher in absolute value than the developing voltage is applied. The toner T supplied to the developing roller 43 by the supplying roller 44 is triboelectrically charged by sliding friction between the developing roller 43 and the developing blade 46, so that an electric charge is imparted to the toner T, and at the same time, a layer thickness is regulated. The toner T on the developing roller 43 regulated in layer thickness is conveyed by rotation of the developing roller 43 to the developing portion which is the opposing portion (contact portion) between the photosensitive drum 1 and the developing roller 43. Then, the toner T on the developing roller 43 is transferred onto a light-portion potential portion on the photosensitive drum 1 by a potential difference between an image portion (light-portion potential portion) of the electrostatic latent image on the photosensitive drum 1 and the developing voltage. By this, the electrostatic latent image on the photosensitive drum 1 is developed (visualized). In this embodiment, a developing voltage (Vdc) applied to the developing roller 43 was −300 V. Further, in this embodiment, each of the supplying voltage applied to the supplying roller 44 and the regulating voltage applied to the developing blade 46 was −400 V. By this, a potential difference by which the negatively charged toner T is easily supplied to the developing roller 43 was formed between the developing roller 43 and the supplying roller 44 and between the developing roller 43 and the developing blade 46.

Further, the blowing-out preventing sheet 49 is disposed in contact with the developing roller 43, and prevents leakage of the toner T from the developing container 41.

Further, the stirring member 47 is disposed in the toner accommodating chamber 42, and not only stirs the toner T accommodated in the toner accommodating chamber 42 but also conveys the toner T toward the supplying roller 44. The stirring member 47 is constituted by including a stirring shaft 47*a* rotatably mounted to the developing container 41 and a sheet member 47*b* which is mounted on the stirring shaft 47*a* and which is rotatable together with the stirring shaft 47*a*. To the stirring shaft 47*a* of the stirring member 47, a driving force is transmitted from a driving motor (not shown) as a driving source constituting a driving means provided in the apparatus main assembly 110, so that the stirring shaft 47*a* is rotationally driven.

Incidentally, the driving sources of the photosensitive drum 1 and the respective rotatable members (the developing roller 43, the supplying roller 44, the stirring member 47) of the developing device 4 may be made common.

Further, in this embodiment, to the process cartridge 10, as shown in FIG. 2, a process cartridge memory MP (hereinafter, simply also referred to as the "memory MP") which is a non-volatile storing means (storing medium) is provided. In the memory MP, use information (information on use history) and lifetime information (information on exchange time (timing)) of the developing device 4 (process cartridge 10) are stored. Further, in the memory MP, use information (information on use history) and lifetime information (information on exchange time) of the toner cartridge 9 may also be stored. The memory MP functions as a memory tag for grasping the information on the developing device 4 (process cartridge 10) and the toner cartridge 9 on the apparatus main assembly 110 side.

Here, in the toner accommodating chamber 42 of the developing container 41 of a new (unused, during start of use) developing device 4 (process cartridge 10), the toner T is a predetermined amount is filled in advance. In this embodiment, the predetermined amount of the toner T filled in advance in the new developing device 4 (process cartridge 10) is 150 g.

<Toner Cartridge>

Next, the toner cartridge 9 in this embodiment will be further described.

As shown in FIGS. 1 and 2, above the process cartridge 10, the toner cartridge 9 as the toner supply container (developer supply container) is disposed. The toner cartridge 9 is constituted so as to be detachably mountable to the apparatus main assembly 110 and the process cartridge 10. Inside the toner cartridge 9, a supply toner chamber 92 for accommodating toner T for supply is formed. In the supply toner chamber 92 of a new (unused, during start of use) toner cartridge 9, the toner T is a predetermined amount is accommodated. In this embodiment, the predetermined amount of the toner T accommodated in the new toner cartridge 9 is 600 g.

The toner cartridge 9 includes a toner discharging device (toner discharging mechanism) 91 as a toner discharging means for discharging the toner T from the toner cartridge 9 toward the developing device 4. In this embodiment, the toner discharging device 91 discharges the toner T accommodated in the supply toner chamber 92 of the toner cartridge 9 downward, and supplies the toner into the developing device 4.

In this embodiment, the toner discharging device 91 employs a volume-variable pump type. This toner discharging device 91 is operated by transmission thereto a driving force from a driving motor (not shown) as a driving source constituting a driving means provided in the apparatus main assembly 110 via the clutch 70 (FIG. 3) as the drive-connecting portion provided in the apparatus main assembly 110. That is, the toner discharging device 91 is drive-connected by the clutch 70 for a desired time at a desired timing, so that a volume-variable pump is operated and the toner in a desired amount is discharged from the toner cartridge 9. The toner T discharged from the toner cartridge 9 is conveyed to the inside of the toner accommodating chamber 42 of the developing container 41 via a communication opening (supply opening) 48 provided in the developing container 41, and is supplied into developing device 4. The toner T supplied into the developing device 4 is stirred by the stirring member 47 in the toner accommodating chamber 42 of the developing container 41.

In this embodiment, the toner in an amount corresponding to an amount of consumption of the toner from the developing device 4 is sequentially supplied from the toner cartridge 9 to the developing device 4. In this embodiment, in a state in which the toner can be sufficiently supplied from the toner cartridge 9 to the developing device 4 in an amount corresponding to an amount of consumption of the toner from the developing device 4, the amount of the toner in the developing device 4 is maintained substantially constantly at the predetermined amount of the toner T filled in advance in the new developing device 4. The above-described state in which the toner can be sufficiently supplied is a state, for example, from a start of use of the toner cartridge 9 until the toner T in the toner cartridge 9 is used up (or until an amount of the toner T capable of being supplied to the developing device 4 in a unit time decreases to a predetermined amount). That is, in this embodiment, the toner consumption amount of the developing device 4 and the toner supply amount from the toner cartridge 9 to the developing device 4 are substantially equal to each other.

Incidentally, there arises a difference between the toner consumption amount of the developing device 4 and the toner supply amount from the toner cartridge 9 to the developing device 4 during the image forming operation in some instances. In such a case, the toner discharging operation can be adjusted so that the toner amount in the developing device 4 is maintained substantially constant at the time of an end of the image forming operation, the time of a start of a subsequent image forming operation, and the like time. For example, in the case where the toner supply amount becomes smaller than the toner consumption amount during the image forming operation, at the time of the end of the image forming operation or the like time, the toner discharging operation can be continued until the toner amount in the developing device 4 becomes the predetermined toner amount. Further, for example, in the case where the toner supply amount becomes larger than the toner consumption amount during the image forming operation, at the time of the start of the subsequent image forming operation or the like time, the toner discharging operation can be stopped until the toner amount in the developing device 4 becomes the predetermined toner amount.

Incidentally, the type of the toner discharging device 91 is not limited to the volume-variable pump type. For example, when the toner in a desired amount can be discharged at a desired timing, such as the case where a toner discharging screw as a conveying member is used, an arbitrary constitution can be employed.

Further, in this embodiment, on the toner cartridge 9, as shown in FIG. 2, a toner cartridge memory MT (hereinafter, simply also referred to as a "memory MT") which is a non-volatile storing means (storing medium) is provided. In the memory MT, use information (information on use history) and lifetime information (information on exchange time (timing)) of the toner cartridge, and the like are stored. The toner cartridge memory MT functions as a memory tag for grasping information on the toner cartridge 9 on the apparatus main assembly 110 side.

<Control Constitution>

Figure 3:
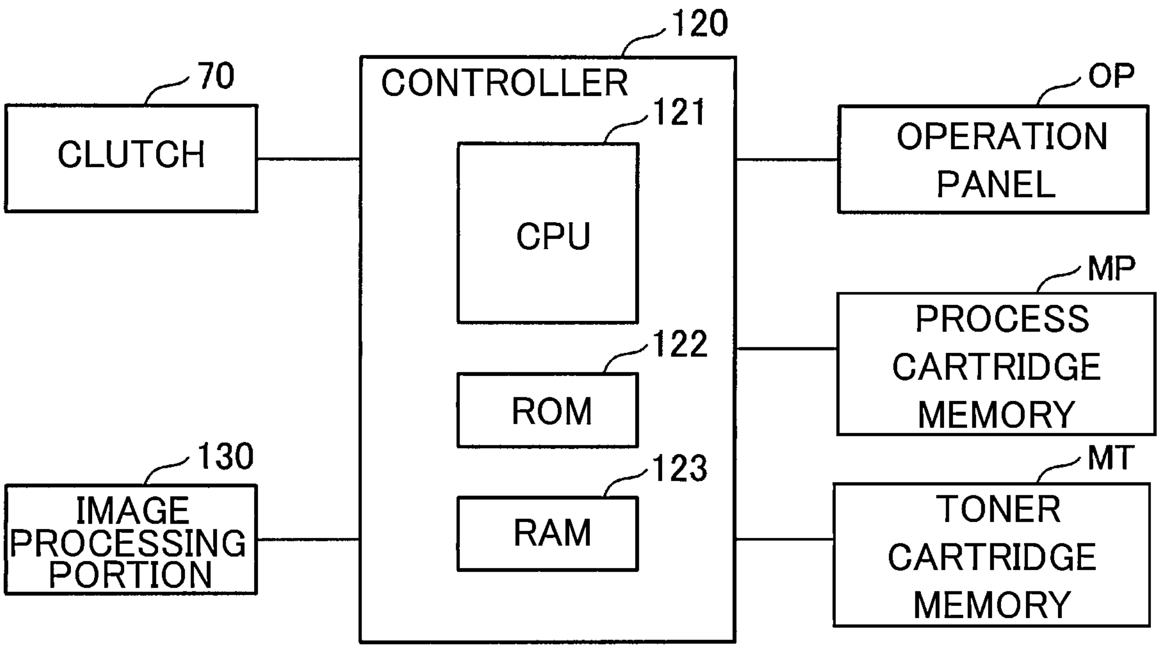
FIG. 3 is a schematic block diagram of a control constitution of the image forming apparatus.

FIG. 3 is a schematic block diagram showing a control constitution of a principal part of the image forming apparatus 100 of this embodiment.

In the apparatus main assembly 110 of the image forming apparatus 100, the controller 120 as a control means is provided. The controller 120 is constituted by including a CPU 121 as a calculation (computation) processing means which is a central element for performing calculation processing, a ROM 122 and a RAM 123 which are storing means (storing media), an input/output circuit (not shown), and the like. In the ROM 122, a control program, a data table acquired in advance, and the like are stored. In the RAM 123, information inputted to the controller 120, detected information, a calculation result, and the like are stored. The input/output circuit controls input and output of signals between the controller 120 and devices connected to the controller 120.

To the controller 120, respective portions (various driving devices, various power sources, various sensors, and the like) of the image forming apparatus 100 are connected. The controller 120 bi-directionally communicates with the respective portions of the image forming apparatus 100 and thus controls the respective portions. The controller 120 executes the image forming operation by controlling the respective portions of the image forming apparatus 100 on the basis of signals (start signal, image signal) inputted from an external device (not shown) such as a personal computer depending on and operation by an operator such as a user or a service person.

Further, the controller 120 controls the supply of the toner from the toner discharging device 91 to the developing device 4 by controlling the clutch 70 for switching drive transmission to the toner discharging device 91 of the toner cartridge 9 and elimination of the drive transmission. Further, in this embodiment, as described later, the controller 120 is capable of calculating the toner amount in the developing device 4 and the toner amount in the toner cartridge 9 by measuring the time in which the clutch 70 is ON.

Further, to the controller 120, an image processing portion (video controller) 130 for generating image information used for forming the image in the image forming apparatus 100 on the basis of the signal inputted from the external device is connected. In this embodiment, as described later, the controller 120 counts the number of pixels of image information acquired from the image processing portion 130 and thus is capable of calculating the toner amount in the developing device 4.

Further, the controller 120 reads the information from and writes the information in the memory MP and the memory MT. Further, to the controller 120, an operation panel OP as an operating portion provided on the apparatus main assembly 110 is connected. The operation panel OP is constituted by including a displaying portion for displaying information to the operator by control of the controller 120, and an input portion for inputting information to the controller 120 depending on the operation by the operator.

<Detection of Toner Amount in Developing Device>

The toner amount (remaining toner amount) can be calculated, for example, by the controller 120 as a detecting means on the basis of the toner consumption amount of the developing device 4, the toner supply amount from the toner cartridge 9 to the developing device 4, and the toner amount in an initial (new, unused) developing device 4.

The toner consumption amount of the developing device 4 can be calculated in the following manner. That is, the toner consumption amount with the image formation (development) can be calculated on the basis of a preliminarily acquired relationship between a counted pixel number of image information and the toner consumption amount (pixel count type, video count type). Further, the toner consumption by a toner consumption operation (fog during non-image formation, adjusting operation, and the like) other than image formation can be calculated from a toner consumption amount acquired in advance for each toner consumption operation other than the image formation.

Further, the toner supply amount from the toner cartridge 9 to the developing device 4 can be calculated on the basis of a time of an operation (toner discharging operation) for discharging the toner from the toner cartridge 9 (supply time measuring type). For example, a time (toner discharging operation time) in which a clutch 70 for being drive-connected to the toner discharging device 91 of the toner cartridge 9 is ON (drive transmission state) is measured. Then, the toner supply amount can be calculated on the basis of a preliminarily acquired relationship between the toner discharging operation time and the toner discharge amount.

Further, the toner amount (remaining toner amount) in the developing device 4 can be sequentially calculated as desired on the basis of the toner amount of the toner filled in the initial developing device 4, the above-described toner consumption amount, and the above-described toner supply amount from the toner cartridge 9 to the developing device 4. Specifically, the toner amount in the developing device 4 can be sequentially calculated by "toner amount in initial developing device 4"−"toner consumption amount of developing device 4"+ "toner supply amount from toner cartridge 9 to developing device 4".

Further, the toner amount in the developing device 4 is corrected on the basis of a detection result by another detecting means for detecting the toner amount in the developing device 4, whereby the toner amount in the developing device 4 can be calculated more accurately. For example, by using a detecting means of a weight detection type in which a weight of the developing device 4 is detected, at an appropriate timing, the above-described toner amount in the developing device 4 can be corrected. Similarly, the detecting means can be used irrespective of a detection type such as an optical detection type, an electrostatic capacity type, a toner (developer) surface detection type, or the like. For example, during the image forming operation, the toner amount in the developing device 4 is detected by the above-described method, and at the time of an end of the image forming operation, it is possible to make correction by the detection result of the above-described another detecting means. Incidentally, the above-described detection types may be used arbitrary in combination or may also be used singly.

Incidentally, the weight detection type is a type in which the toner amount in the developing container 41 is detected on the basis of the weight of the developing container 41 in which the toner is accommodated. Further, the optical detection type is a type in which a light source for irradiating an inside of the developing container 41 with light and a light receiving portion for receiving the light passing through the inside of the developing container 41 are used and in which the toner amount is detected on the basis of a charge in light receiving state of the light receiving portion. Further, the electrostatic capacity type is a type in which an electrode changing in electrostatic capacity detected depending on a change in state of the toner in the developing container 41 is used (for example, an electroconductive member is applied onto an inner wall of the container) and in which the toner amount in the developing container 41 is detected on the basis of the detected change in electrostatic capacity. Further, the toner surface detection type is a type in which the toner amount in the developing container 41 is detected on the basis of a position (height) of the surface of the toner in the developing container 41. The toner amount in the developing device 4 can also be detected by using the above-described another detecting means singly or in combination arbitrary instead of the above-described method based on the image information.

Use history values (toner consumption amount, toner supply amount, remaining toner amount) are stored in the memory MP.

<Detection of Toner Amount in Toner Cartridge>

The toner amount (remaining toner amount) in the toner cartridge 9 can be calculated by, for example, the controller 120 as a detecting means on the basis of the toner supply amount from the toner cartridge 9 to the developing device 4 and the toner amount in an initial (new, unused) toner cartridge 9.

The time (toner discharging operation time) in which the clutch 70 for being drive-connected to the toner discharging device 91 is ON is measured, and then, the toner supply amount can be calculated on the basis of the preliminarily acquired relationship between the toner discharging operation time and the toner discharge amount.

Then, on the basis of the toner amount of the toner filled in the initial toner cartridge 9 and the toner supply amount from the toner cartridge 9 to the developing device 4, the toner amount (remaining toner amount) in the toner cartridge 9 can be sequentially calculated. Specifically, the toner amount in the toner cartridge 9 can be sequentially calculated by "toner amount in initial toner cartridge"–"toner supply amount from toner cartridge 9 to developing device 4".

Incidentally, in this embodiment, the toner supply amount was calculated on the basis of a time in which the clutch 70 is ON, i.e., an operation time of a pump constituting the toner discharging device 91, but the present invention is not limited thereto. For example, in the case where the toner discharging device 91 is constituted by including a toner discharging screw, the toner supply amount may be calculated on the basis of a total rotation number of the toner discharging screw. Further, as the detecting means for detecting the toner amount in the toner cartridge 9, similarly as the above-described detecting means for detecting the toner amount in the developing device 4, for example, detecting means of the optical detection type, the electrostatic capacity type, the toner surface detection type, the weight detection type, and the like can be used irrespective of the detection type. Incidentally, the above-described detection types may be used arbitrarily in combination or may also be used singly.

The toner cartridge 9 reaches an exchange timing in the case where the amount of the toner accommodated inside thereof decreases to a predetermined amount (typically, in the case where almost all the toner accommodated inside thereof is discharged toward the developing device 4). That is, in the case where the toner amount in the toner cartridge 9 decreases to the predetermined amount and reaches a state in which the toner cannot be sufficiently supplied from the toner cartridge 9 to the developing device 4 in an amount corresponding to an amount of the toner consumed from the developing device 4, exchange of the toner cartridge 9 is needed. Specifically, it is possible to define that the toner amount in the new toner cartridge 9 is a remaining toner amount of 100% and that a state in which the toner amount in the toner cartridge 9 decreases to a predetermined threshold is a remaining toner amount of 0%.

In this embodiment, the remaining toner amount of 0% corresponds to a state in which the toner in the toner cartridge 9 is substantially completely discharged. However, a state in which the toner somewhat remains in the toner cartridge 9 may be regarded as a state of the remaining toner amount of 0% (toner out).

The use history values (toner supply amount, remaining toner amount) of the toner cartridge 9 are stored in the memory MT. The use history values (toner supply amount, remaining toner amount) of the toner cartridge 9 may also be stored in the memory MP. Further, in this embodiment, at the time when the remaining toner amount indicated by the use history value of the toner cartridge 9 reaches the predetermined threshold, the controller 120 executes processing of notifying the operator of the toner out of the toner cartridge 9.

The controller 120 causes the display portion of the operation panel OP to display information, so that the controller 120 is capable of notifying the operator of the information. Incidentally, the notification of the information to the operator is not limited to notification by display such as a message at the display portion. For example, the notification may also be made by warning sound at a pronunciation (vocalization) portion or generation of voice or by lighting or flickering of light at a light emitting portion, or the like. Further, in place of or in addition to the above-described notification of the information to the operator in the operation panel OP, the notification of the information to the operator may be made in the external device communicatably connected to the image forming apparatus 100.

On the basis of the above-described notification, the operator is capable of demounting the used (-up) toner cartridge 9 from the developing device 4 (process cartridge 10) and then is capable of mounting the new toner cartridge 9 to the developing device 4 (process cartridge 10).

Further, the controller 120 may discriminate and notify the exchange timing (lifetime) of the developing device 4 (process cartridge 10) by counting the exchange number of the toner cartridge 9 for a single developing device 4 (process cartridge 10). The exchange timing (lifetime) of the developing device 4 (process cartridge 10) may also be set on the basis of an index value (for example, rotation number or rotation time) of a use amount of the developing roller 43 in the developing device 4, an index value (for example, rotation number or rotation time) of a use amount of the photosensitive drum 1. In the case where the process cartridge 10 reaches the exchange timing, the operator is capable of demounting the used (-up) process cartridge 10 from the apparatus main assembly 110 and then is capable of mounting the new process cartridge to the apparatus main assembly 110.

Further, in this embodiment, the toner in the amount corresponding to the amount corresponding to the amount of consumption of the toner from the developing device 4 was sequentially supplied, but may also be periodically supplied, for example, in the case where the toner amount in the developing device 4 decreases to a predetermined amount or in the case where the toner is consumed by a predetermined amount. Further, a batch toner supplying system with a toner pack or a piston, which is capable of collectively supplying the toner from the toner cartridge 9 to the developing device 4 may be employed for the toner cartridge 9. Further, in the batch toner supplying system, the image forming apparatus 100 may be capable of being used in a state in which the toner cartridge 9 as the supply container is demounted from the image forming apparatus 100.

<Photosensitive Member>

Next, the photosensitive member (photosensitive drum 1) used in this embodiment will be further described.

The photosensitive member used in this embodiment is constituted by forming an undercoat layer on a substrate (supporting member), a charge generating layer on the undercoat layer, a charge transporting layer on the charge generating layer, and a protective layer on the charge transporting layer. The protective layer may preferably be an outermost layer of the photosensitive member.

As a manufacturing method of the photosensitive member, it is possible to cite a method in which application liquids of the respective layers specifically described later are prepared and then are applied and dried in a desired layer formation order. As an application liquid applying (coating) method, it is possible to cite dip coating, spray coating, wire bar coating, rig coating, and the like method. Of these methods, the dip coating is preferred from the viewpoints of efficiency and productivity.

(Substrate)

The substrate may preferably be an electroconductive supporting member having electroconductivity. Further, as a shape of the substrate, it is possible to cite a cylindrical shape, a belt shape, a sheet shape, and the like. In this embodiment, a cylindrical substrate is employed. Further, a surface of the substrate may be subjected to electrochemical treatment such as anodic oxidation, or blasting, cutting treatment, or the like. As a material of the substrate, metal, resin, glass, and the like are preferred. As the metal, it is possible to cite aluminum, iron, nickel, copper, gold, stainless steel, alloys of these metals, and the like. Of these metals, an aluminum substrate using aluminum is preferred from the viewpoints of cost and ease in processing. Further, in the cases of the resin and the glass, electroconductivity may be imparted by treatment such as mixing or coating of an electroconductive material.

Further, an electroconductive layer may be provided on the substrate. By providing the electroconductive layer, it is possible to hide scars and unevenness of the surface of the substrate and to control light reflection at the surface of the substrate. The electroconductive layer may preferably contain electroconductive particles and a resin. As a material of the electroconductive particles, it is possible to cite a metal oxide, metal, carbon black, and the like.

As the metal oxide, it is possible to cite zinc oxide, aluminum oxide, indium oxide, silicon oxide, zirconium oxide, tin oxide, titanium oxide, magnesium oxide, antimony oxide, bismuth oxide, and the like. As the metal, it is possible to cite aluminum, nickel, iron, nichrome, copper, zinc, silver, and the like. Of these, as the electroconductive particles, the metal oxide may preferably be used, and particularly, titanium oxide, tin oxide, and zinc oxide may more preferably be used. In the case where the metal oxide is used as the electroconductive particles, a surface of the metal oxide may be treated with a silane coupling agent, or the metal oxide may be doped with an element such as phosphorus or aluminum or with an oxide of the element. Further, the electroconductive particles may have a laminated structure including core particles and a coating layer coating the core particles. As the core particles, it is possible to cite particles of titanium oxide, barium sulphate, zinc oxide, and the like. As the coating layer, it is possible to cite the metal oxide such as tin oxide. Further, in the case where the particles of the metal oxide are used as the electroconductive particles, a volume-average particle size thereof may preferably be 1 nm or more and 500 nm or less, more preferably be 3 nm or more and 400 nm or less.

As the resin, it is possible to cite polyester resin, polycarbonate resin, polyvinyl acetal, acrylic resin, silicon resin, epoxy resin, melamine resin, polyurethane resin, phenolic resin, alkyd resin, and the like.

Further, the electroconductive layer may further contain a masking agent such as silicone oil, resin particles, titanium oxide, and the like.

An average film thickness of the electroconductive layer may preferably be 1 μm or more and 50 μm or less, particularly preferably be 3 μm or more and 40 μm or less.

The electroconductive layer can be formed by preparing an application liquid for the electroconductive layer containing the above-described materials and a solvent and then by forming and drying a film of this application liquid. As the solvent used for the application liquid, it is possible to cite an alcohol-based solvent, a sulfoxide-based solvent, a ketone-based solvent, an ether-based solvent, an ester-based solvent, an aromatic hydrocarbon-based solvent, and the like. As a dispersing method for dispersing the electroconductive particles in the application liquid for the electroconductive layer, it is possible to cite methods using a paint shaker, a sand mill, a ball mill, a liquid collision high-speed dispersing machine, and the like method.

(Undercoat Layer)

The undercoat layer is provided on the substrate or the electroconductive layer. By providing the undercoat layer, an adhesive function between the substrate or the electroconductive layer and its upper layer is enhanced, so that it is possible to impart a charge injection preventing function to the photosensitive member.

The undercoat layer may preferably contain a resin. Further, by polymerizing a composition containing a monomer having a polymerizable functional group, the undercoat layer as a cured film may be formed.

As the resin, it is possible to cite polyester resin, polycarbonate resin, polyvinyl acetal, acrylic resin, epoxy resin, melamine resin, polyurethane resin, phenolic resin, polyvinyl phenol resin, alkyd resin, polyvinyl alcohol resin, polyethylene oxide resin, polypropylene oxide resin, polyamide resin, polyamide acid resin, polyimide resin, polyamideimide resin, cellulose resin, and the like.

As the polymerizable functional group of the monomer having the polymerizable functional group, it is possible to cite isocianate group, block isocyanate group, methylol group, alkylated methylol group, epoxy group, metal alkoxide group, hydroxyl group, amino group, carboxyl group, thiol group, carboxylic anhydride group, C—C double bond group, and the like group.

Further, for the purpose of enhancing an electric characteristic, the undercoat layer may further contain an electron transporting substance, metal oxide, metal, an electroconductive polymer, and the like. Of these, the electron transporting substance and the metal oxide may preferably be used.

As the electron transporting substance, it is possible to cite a quinone compound, an imide compound, a benzimidazole compound, a cyclopentadienylidene compound, a fluorenone compound, a xanthone compound, a benzophenone compound, a cyanovinyl compound, an aryl halide compound, a silole compound, a boron-containing compound, and the like compound. As the electron transporting substance, an electron transporting substance having a polymerizable functional group is used and is co-polymerized with the monomer having the above-described polymerizable functional group, so that the undercoat layer may be formed as a cured film.

As the metal oxide, it is possible to cite indium-tin oxide, tin oxide, titanium oxide, zinc oxide, aluminum oxide, silicon oxide, and the like. As the metal, it is possible to cite, gold silver, aluminum, and the like.

Further, the undercoat layer may further contain an additive.

An average film thickness of the undercoat layer may preferably be 0.1 μm or more and 50 μm or less, more preferably be 0.2 μm or more and 40 μm or less, particularly preferably be 0.3 μm or more and 30 μm or less.

The undercoat layer can be formed by preparing an application liquid for the undercoat layer containing the above-described materials and a solvent and then by forming and drying and/or curing a film of this application liquid. As the solvent used for the application liquid, it is possible to cite an alcohol-based solvent, a ketone-based solvent, an ether-based solvent, an ester-based solvent, an aromatic hydrocarbon-based solvent, and the like.

(Charge Generating Layer)

The charge generating layer may preferably contain a charge generating substance and a resin. As the charge generating substance, it is possible to cite an azo pigment, a perylene pigment, a polycyclic quinone pigment, an indigo pigment, a phthalocyanine pigment, and the like. Of these, the azo pigment and the phthalocyanine pigment are preferable. Of the phthalocyanine pigment, an oxytitanium phthalocyanine pigment, a chlorogallium phthalocyanine pigment, and a hydroxygallium phthalocyanine pigment are preferable.

A content of the charge generating substance in the charge generating layer may preferably be 40 weight % or more and 85 weight % or less, more preferably be 60 weight % or more and 80 weight % or less.

As the resin, it is possible to cite polyester resin, polycarbonate resin, polyvinyl acetal resin, polyvinyl butyral resin, acrylic resin, silicone resin, epoxy resin, melamine resin, polyurethane resin, phenolic resin, polyvinyl alcohol resin, cellulose resin, polystyrene resin, polyvinyl acetate resin, polyvinyl chloride resin, and the like. Of these, the polyvinyl butyral resin is preferable.

Further, the charge generating layer may further contain an additive such as antioxidant, UV absorber, and the like. Specifically, it is possible to cite a hindered phenol compound, a hindered amine compound, a sulfur compound, a phosphorus compound, a benzophenone compound, and the like.

An average film thickness of the charge generating layer may preferably 0.1 μm or more and 1 μm or less, more preferably be 0.15 μm or more and 0.4 μm or less.

The charge generating layer can be formed by preparing an application liquid for the charge generating layer containing the above-described materials and a solvent and then by forming and drying a film of this application liquid. As the solvent used for the application liquid, it is possible to cite an alcohol-based solvent, a sulfoxide-based solvent, a ketone-based solvent, an ether-based solvent, an ester-based solvent, an aromatic hydrocarbon-based solvent, and the like.

(Charge Transporting Layer)

The charge transporting layer may preferably contain a charge transporting substance and a resin. As the charge transporting substance, it is possible to cite, for example, a polycyclic aromatic compound, a heterocyclic compound, a hydrazone compound, a styryl compound, an enamine compound, a benzidine compound, a triarylamine compound, resins having groups derived from these compounds, and the like. Of these, the triarylamine compound and the benzidine compound are preferable.

A content of the charge transporting substance in the charge transporting layer may preferably be 25 weight % or more and 70 weight % or less, more preferably be 30 weight % or more and 55 weight % or less.

As the resin, it is possible to cite polyester resin, polycarbonate resin, acrylic resin, polystyrene resin, and the like. Of these, polycarbonate resin and polyester resin are preferable. As the polyester resin, particularly, polyarylate resin is preferable.

A content ratio (weight ratio) between the charge transporting layer and the resin may preferable be 4:10 to 20:10, more preferably be 5:10 to 12:10.

Further, the charge generating layer may further contain an additive such as antioxidant, UV absorber, plasticizer, leveling agent, slippage-imparting agent, wear resistance improver, and the like. Specifically, it is possible to cite a hindered phenol compound, a hindered amine compound, a sulfur compound, a phosphorus compound, a benzophenone compound, siloxane-modified resin, silicone oil, fluorine-containing resin particles, polystyrene resin particles, polyethylene resin particles, silica particles, alumina particles, boron nitride particles, and the like.
and the like.

An average film thickness of the charge generating layer may preferably be 5 μm or more and 50 μm or less, more preferably be 8 μm or more and 40 μm or less, particularly preferably be 10 μm or more and 30 μm or less. In this embodiment, an average film thickness of the charge transporting layer was 12 μm.

The charge transporting layer can be formed by preparing an application liquid for the charge generating layer containing the above-described materials and a solvent and then by forming and drying a film of this application liquid. As the solvent used for the application liquid, it is possible to cite an alcohol-based solvent, a ketone-based solvent, an ether-based solvent, an ester-based solvent, an aromatic hydrocarbon-based solvent, and the like. Of these solvents, the ether-based solvent and the aromatic hydrocarbon-based solvent are preferable.

Incidentally, in this embodiment, the laminated-type photosensitive member including the charge generating layer and the charge transporting layer was used, but a single layer-type photosensitive member containing the charge generating substance and the charge transporting substance may be used. The single layer-type photosensitive member can be formed by preparing an application liquid for the photosensitive member containing the charge generating substance, the charge transporting substance, the resin, and the solvent and then by forming and drying a film of this application liquid. The charge generating substance, the charge transporting substance, and the resin are the same as those for the laminated-type photosensitive member described above.

(Protective Layer)

The photosensitive member used in this embodiment is provided with a wear-resistant protective layer at an outermost layer in order to improve wear resistance. By providing the protective layer, durability can be improved. The protective layer may preferably contain the electroconductive particles and/or the charge transporting substance, and the resin.

As the electroconductive particles, it is possible to cite particles of the metal oxide such as titanium oxide, zinc oxide, tin oxide, indium oxide, and the like.

As the charge transporting substance, it is possible to cite, a polycyclic aromatic compound, a heterocyclic compound, a hydrazone compound, a styryl compound, an enamine compound, a benzidine compound, a triarylamine compound, resins having groups derived from these compounds, and the like. Of these, the triarylamine compound and the benzidine compound are preferable.

As the resin, it is possible to cite polyester resin, acrylic resin, phenoxy resin, polycarbonate resin, polystyrene resin, phenolic resin, melamine resin, epoxy resin, and the like. Of these, polycarbonate resin, polyester resin, and acrylic resin are preferable.

Further, the protective layer may be formed as a cured film by polymerizing a composition containing a monomer having a polymerizable functional group. At that time, as reaction, it is possible to cite thermal polymerization, photopolymerization, radiation-induced polymerization, and the like. The polymerizable functional group of the monomer having the polymerizable functional group, it is possible to cite acrylic group, methacrylic group, and the like group. As the monomer having the polymerizable functional group, a material having charge transportability may be used.

Further, the protective generating layer may further contain an additive such as antioxidant, UV absorber, plasticizer, leveling agent, slippage-imparting agent, wear resistance improver, and the like. Specifically, it is possible to cite a hindered phenol compound, a hindered amine compound, a sulfur compound, a phosphorus compound, a benzophenone compound, siloxane-modified resin, silicone oil, fluorine-containing resin particles, polystyrene resin particles, polyethylene resin particles, silica particles, alumina particles, boron nitride particles, and the like.

An average film thickness of the protective layer may preferably be 0.5 μm or more and 10 μm or less, more preferably be 1 μm or more and 7 μm or less. In this embodiment, an average film thickness of the protective layer was 3 μm.

The protective layer can be formed by preparing an application liquid for the protective layer containing the above-described materials and a solvent and then by forming and drying and/or curing a film of this application liquid. As the solvent used for the application liquid, it is possible to cite an alcohol-based solvent, a ketone-based solvent, an ether-based solvent, a sulfoxide-based solvent, an ester-based solvent, an aromatic hydrocarbon-based solvent, and the like.

<Toner>

Figure 4:
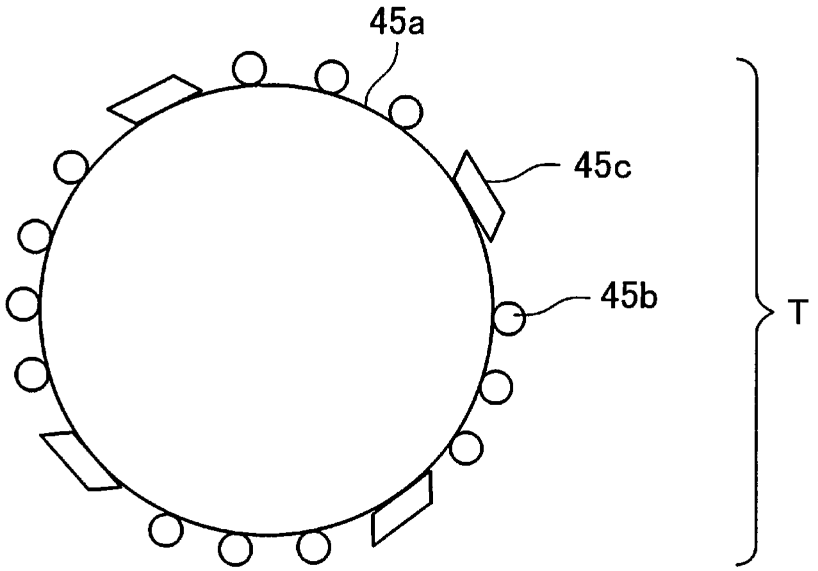
FIG. 4 is a schematic view of toner.

Next, the toner T used in this embodiment will be further described. FIG. 4 is a schematic view of the toner T. Here, first, the toner filled in advance in the new developing device 4 (hereinafter, also referred to as "initially filled toner (or initial developer") T will be described.

In this embodiment, the toner T contains the negatively chargeable toner particles 45*a*, silica particles 45*b*, and positively chargeable lubricant particles 45*c*. That is, in this embodiment, the toner T is constituted by externally adding thereto the negatively chargeable toner particles 45*a*, the silica particles 45*b* for ensuring flowability of the toner T and for improving chargeability of the toner T, and the positively chargeable lubricant particles 45*c*. Here, the terms "negatively chargeable" and "positively chargeable" mean that when the particles are electrically charged in the developing device 4, the particles are charged to a negative (−) polarity (i.e., the charge polarity is the negative polarity) and to a positive (+) polarity (i.e., the charge polarity is the positive polarity), respectively.

Incidentally, as specifically described later, toner accommodated in the toner cartridge 9 (hereinafter, referred to as "supply toner (or supply developer)") T' is different in external addition amount from the positively chargeable lubricant particles 45*c* to the toner particles 45*a* from the initially filled toner T. In this embodiment, other constitutions of the supply toner T' are the same as those of the initially filled toner T.

(Toner Particles)

The toner particles 45*a* of the toner T used in this embodiment is non-magnetic one-component granulation polymerization toner of which charge polarity is the negative polarity, and a weight-average particle size is 7 μm.

As a manufacturing method of the toner particles, it is possible to use well-known kneading and pulverizing method and wet manufacturing method. From viewpoints of uniformization of a particle size and shape controllability of the particles, the wet manufacturing method can be preferably used. Further, as the wet manufacturing method, it is possible to cite a suspension polymerization method, a dissolution suspension method, an emulsion polymerization aggregation method, an emulsion aggregation method, and the like method.

In this embodiment, the suspension polymerization method will be described. In the suspension polymerization method, first, a polymerizable monomer composition in which a polymerizable monomer for generating a binder resin, a colorant, and other additive as needed are uniformly dissolved or dispersed with use of a dispersing machine such as a ball mill or an ultrasonic dispersing machine is prepared (a preparation step of the polymerizable monomer composition). At this time, as needed, it is possible to appropriately add a polyfunctional monomer, a chain transfer agent, a wax as a parting agent, a charge control agent, a plasticizer, and the like.

Next, the above-described polymerizable monomer composition is poured into an aqueous medium prepared in advance, and then liquid droplets of the polymerizable monomer composition are formed in a desired size of the toner particles 45*a* by a stirring machine or a dispersing machine, which has a high shearing force (granulation step). The aqueous medium in the gradation step may preferably contain a dispersion stabilizer in order to control particle size of the toner particles 45*a*, sharpen a particle size distribution of the toner particles 45*a*, and suppress coalescence of the toner particles 45*a* in a manufacturing process. The dispersion stabilizer is roughly classified in general into a polymer for exhibiting a repelling force due to steric hindrance and a hardly water-soluble inorganic compound. Fine particles of the hardly water-soluble inorganic compound may suitably be used because the fine particles are dissolved by acid or alkali and therefore can be easily removed by being dissolved through washing thereof with the acid or the alkali after the polymerization.

After the granulation step or while performing the granulation, a temperature may preferably be set at 50° C. or more and 90° C. or less and then polymerization of the polymerizable monomer contained in the polymerizable monomer composition is performed, so that a toner particle dispersion is obtained (polymerization step). In the polymerization step, a stirring operation may preferably be performed so that a temperature distribution becomes uniform. In the case where a polymerization initiator is added, the stirring operation can be performed at a predetermined timing for a required time. Further, for the purpose of obtaining a desired molecular weight distribution, the temperature may be increased in a later half of a polymerization reaction, and further, in order to remove unreacted polymerizable monomer, by-product, and the like to an outside of a system, a part of the aqueous medium may be distilled away by a distilling operation in the latter half of the reaction or after the reaction. The distilling operation can be performed under normal pressure or reduced pressure.

The particle size of the toner particles 45_a_ may preferably have a weight-average particle size of 3.0 μm or more and 10.0 μm or less from a viewpoint of obtaining an image of high precision and high resolution. The weight-average particle size of the toner can be measured by a pore electric resistance method. For example, the weight-average particle size can be measured using a "Coulter Counter Multisizer 3" (manufactured by Beckman Coulter, Inc.).

The thus-obtained toner particle dispersion liquid is subjected to a filtering step in which the toner particles 45_a_ and the aqueous medium are solid-liquid separated. The solid-liquid separation can be made by a general filtering method. Thereafter, in order to remove a foreign matter which cannot be completely removed from toner particle surfaces, the toner particles may preferably be further washed by re-slurry or pouring washing with washing water, or the like. After sufficient washing is made, the resultant dispersion liquid is solid-liquid separated again, so that toner cake is obtained. Thereafter, the toner cake is dried by a well-known drying means, and as needed, a group of particles having a particle size other than a predetermined particle size is separated by classification, so that toner particles 45_a_ are obtained. At this time, the group of particles having the particle size other than the predetermined particle size may be utilized again for improving a final yield.

(External Additive)

-Lubricant Particles-

In this embodiment, to the toner particles 45_a_, the lubricant particles 45_c_ are externally added. The lubricant particles 45_c_ have the positive charge polarity, i.e., opposite in charge, polarity to a charge polarity of the toner particles 45_a_, so that the lubricant particles 45_c_ are not readily transferred onto the recording material in the transfer portion Nt. For that reason, the lubricant particles 45_c_ deposited on the surface of the photosensitive drum 1 are liable to reach the cleaning member 63. As the positively chargeable lubricant particles 45_c_, for example, it is possible to cite fatty acid metal salt particles and the like. The fatty acid metal salt particles are particles of a salt consisting of a fatty acid and a metal.

The fatty acid may be either of a saturated fatty acid or an unsaturated fatty acid. As a number of carbon atoms of the fatty acid, it is possible to cite 10 or more and 25 or less (preferably 12 or more and 22 or less). Incidentally, the number of carbon atoms of the fatty acid includes the number of carbon atoms of carboxyl group.

As the fatty acid, it is possible to cite, for example, the saturated fatty acid such as behenic acid, stearic acid, palmitic acid, myristic acid, or lauric acid; the unsaturated fatty acid such as oleic acid, linolic acid, or ricinolic acid; and the like. Of these fatty acids, stearic acid or lauric acid is preferred, and stearic acid is more preferred.

As the metal, divalent metal is preferred. As the metal, it is possible to cite magnesium, calcium, aluminum, barium, zinc, and the like. Of these metals, zinc is preferred.

As the fatty acid metal salt particles, it is possible to cite, for example, particles of each of a metal salt of stearic acid, such as aluminum stearate, calcium stearate, potassium stearate, magnesium stearate, barium stearate, lithium stearate, zinc stearate, copper stearate, lead stearate, nickel stearate, strontium stearate, cobalt stearate, or sodium stearate; a metal salt of palmitic acid, such as zinc palmitate, cobalt palmitate, copper palmitate, magnesium palmitate, aluminum palmitate, or calcium palmitate; a metal salt of lauric acid, such as zinc laurate, manganese laurate, calcium laurate, iron laurate, magnesium laurate, or aluminum laurate; a metal salt of oleic acid, such as zinc oleate manganese oleate, iron oleate, aluminum oleate, copper oleate, magnesium oleate, or calcium oleate; a metal salt of linolic acid, such as zinc linoleate, cobalt linoleate, or calcium linoleate; and a metal salt of ricinolic acid, such as zinc ricinoleate or aluminum ricinoleate. Of these fatty acid metal salt particles, the particles of the metal salt of stearic acid or the metal salt of lauric acid are preferred, particles of zinc stearate or zinc laurate are more preferred, and zinc stearate is further preferred.

An external addition amount of the positively chargeable lubricant particles 45_c_ to the toner particles 45_a_ may preferably be 0.6 weight % (wt. %) or less. With a larger external addition amount of the positively chargeable lubricant particles 45_c_ to the toner particles 45_a_, an effect of reducing a torque for rotating the photosensitive drum 1 by reducing a frictional force between the photosensitive drum 1 and the cleaning member 63 is more improved. However, when the positively chargeable lubricant particles 45_c_ are excessively externally added to the toner particles 45_a_, there is a possibility that flowability of the toner becomes poor. As an example of the influence of poor flowability of the toner T, it is possible to cite than a density of a solid image in an in-plane latter half of the recording material P (on a trailing end side of a conveying direction of the recording material P) becomes low, i.e., that an image defect such as a so-called "solid followability failure" is liable to occur. From this viewpoint, the external addition amount of the positively chargeable lubricant particles 45_c_ to the toner (initially filled toner) T may preferably be 0.6 weight % or less to a total weight of the toner particles 45_a_ as described above. Further, when the external additive amount of the positively chargeable lubricant particles 45_c_ to the toner particles 45_a_ is excessively small, there is a possibility that the effect of reducing the torque for rotating the photosensitive drum 1 by reducing the frictional force between the photosensitive drum 1 and the cleaning member 63 cannot be sufficiently obtained. From this viewpoint, the external addition amount of the positively chargeable lubricant particles 45_c_ to the toner (initially filled toner) T may preferably be 0.1 weight % or more, more preferably be 0.3 weight % or more, to the total weight of the toner particles 45_a_.

An average particle size of the positively chargeable lubricant particles 45_c_ may preferably be 0.5 μm or more and 2 μm or less. When the average particle size of the positively chargeable lubricant particles 45_c_ is smaller than 0.5 μm, the lubricant particles 45_c_ are not readily detached from the toner T, so that there is a possibility that the lubricant particles 45_c_ are not readily supplied to the surface of the photosensitive drum 1. Further, when the average particle size of the positively chargeable lubricant particles 45_c_ is larger than 2 μm, the lubricant particles 45_c_ are excessively easily detached from the toner particles 45_a_. As a result, the lubricant particles 45_c_ cannot pass through the developing blade 46 in the developing device 4 and are left inside the developing container 41, so that there is a possibility that the lubricant particles 45_c_ are not readily supplied to the surface of the photosensitive drum 1.

Here, the average particle size of the lubricant particles can be measured by, for example, the following method. Each of images of primary particles of the lubricant particles is photographed by being observed through a scanning electron microscope (SEM) device ("S-4100", manufactured by K.K. Hitachi Seisakusho). Then, this image is captured by an image analyzing device ("LUZEX III", manufactured by K.K. Nireco), and an area per particle is measured by image analysis of primary particle, so that an equivalent circle diameter is calculated from an area value. This calculation of the equivalent circle diameter is carried out for 100 particles. Then, a 50%-diameter (D50) in a volume-basis cumulative frequency of the acquired equivalent circle diameters is taken as an average primary diameter (average equivalent circle diameter D50) of the lubricant particles. Incidentally, a magnification of the electron microscope is adjusted so that the lubricant particles of about 10 or more particles and about 50 or more particles are photographed in one field of view, and the equivalent circle diameter of the primary particles is acquired by observations of a plurality of fields of view in combination.

-Silica Particles-

As the silica particles 45*b*, particles principally comprising silica, i.e., $SiO_2$ as a main component can be used, and the particles may be crystalline particles or non-crystalline particles. Further, as the silica particles 45*b*, particles manufactured by using a silicon compound, such as water glass or alkoxy silane, as a source material may be used, or particles obtained by pulverizing quarts may be used.

Specifically, as the silica particles 45*b*, it is possible to cite, for example, sol-gel silica particles, aqueous colloidal silica particles, alcoholic silica particles, fumed silica particles obtained by a vapor-phase method, fused silica particles, and the like. Of these, as the silica particles 45*b*, the sol-gel silica particles are preferred from a viewpoint such that the following characteristic is satisfied.

Further, the silica particles 45*b* may preferably be monodisperse and spherical silica particles. The monodisperse and spherical silica particles are dispersed on the surfaces of the toner particles 45*a* in a state close to a uniform state, so that a stable spacer effect can be obtained.

The average particle size (primary particle size) of the silica particles 45*b* may preferably be 1 nm or more and 200 nm or less. Further, from a viewpoint of durability, it is also possible to mix a plurality of silica particles 45*b* consisting of small silica particles of 1 nm or more and 30 nm or less in average particle size (primary particle size) and large silica particles of 30 nm or more and 200 nm or less in average particle size (primary particle size). By using the silica particles 45*b* having such average particle sizes in combination, effects of ensuring flowability of the toner T and improving chargeability of the toner T can be satisfactorily obtained.

Further, the external addition amount of the silica particles 45*b* to the toner particles 45*a* may preferably be 0.5 weight % or more and 10 weight % or less to a total weight of the toner particles 45*a*. The silica particles 45*b* are externally added to the toner particles 45*a* in such an external addition amount, the effects of ensuring the flowability of the toner T and improving the chargeability of the toner T can be satisfactorily obtained.

Incidentally, with respect to the silica particles 45*b*, "monodisperse" can be defined by a standard deviation to the average diameter thereof including aggregate, and the standard deviation may preferably be (volume-average particle size D50)×0.22 or less. Further, with respect to the silica particles 45*b*, "spherical" can be defined by average circularity, and the average circularity may preferably be 0.75 or more and 1.0 or less, more preferably be 0.9 or more and 1.0 or less, further preferably be 0.92 or more and 0.98 or less.

Here, the average particle size of the silica particles can be measured by the following method. Each of images of primary particles of the silica particles is photographed by being observed through a scanning electron microscope (SEM) device ("S-4100", manufactured by K.K. Hitachi Seisakusho). Then, this image is captured by an image analyzing device ("LUZEX III", manufactured by K.K. Nireco), and an area per particle is measured by image analysis of primary particle, so that an equivalent circle diameter is calculated from an area value. This calculation of the equivalent circle diameter is carried out for 100 silica particles. Then, a 50%-diameter (D50) in a volume-basis cumulative frequency of the acquired equivalent circle diameters is taken as an average primary diameter (average equivalent circle diameter D50) of the silica particles. Incidentally, a magnification of the electron microscope is adjusted so that the silica particles of about 10 or more particles and about 50 or more particles are photographed in one field of view, and the equivalent circle diameter of the primary particles is acquired by observations of a plurality of fields of view in combination.

The average circularity of the silica particles can be measured by the following method. First, primary particles of the silica particles are observed by the SEM device, and from planar image analysis of obtained primary particles, the circularity of the silica particles is obtained as "100/SF2" calculated by the following formula.

$$\text{Circularity } (100/SF2) = 4\pi \times (A/I^2)$$

In the formula, "I" represents a peripheral length of the primary particles, and "A" represents a projection area of the primary particles.

Further, the average circularity of the silica particles is obtained as 50%-circularity in cumulative frequency of circularity of 100 primary particles of the silica particles obtained by the above-described planar image analysis.

-External Addition Method-

In this embodiment, in order to externally add the silica particles 45*b* and the positively chargeable lubricant particles 45*c* to the toner particles 45*a*, as a surface modifying device, "Henschel mixer", (manufactured by NIPPON COKE & ENGINEERING CO., LTD.) was used. Details thereof are as described in JP-A No. 2016-38591.

Figure 7:
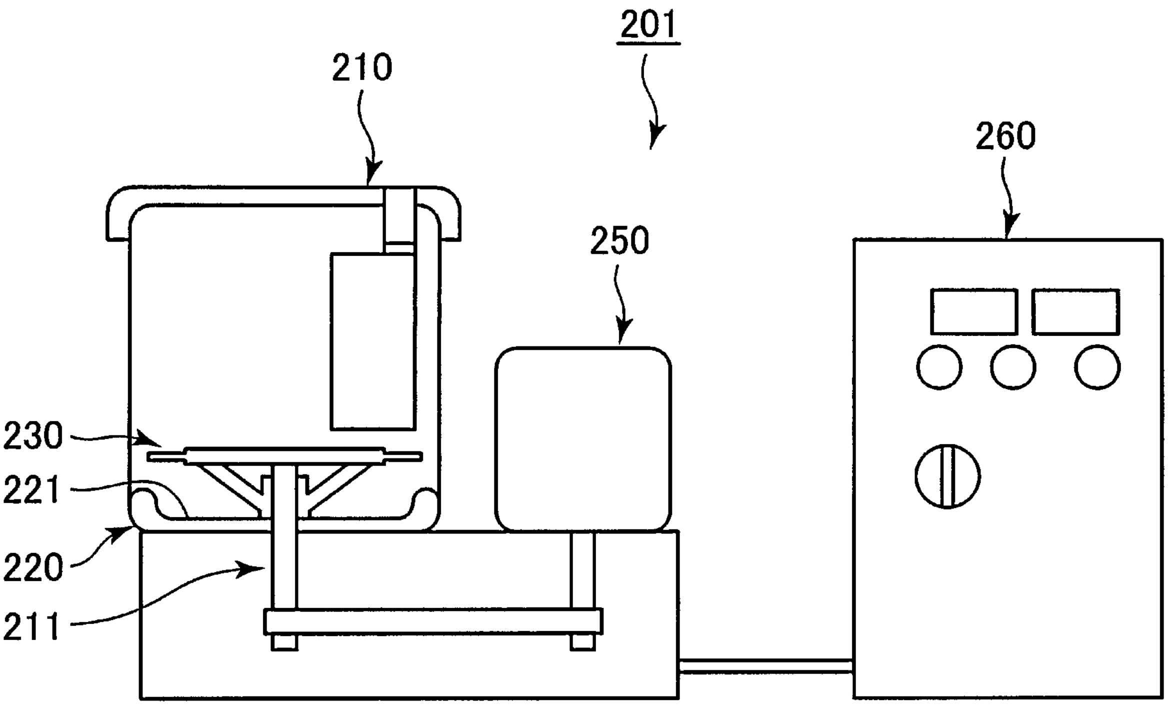
FIG. 7 is a schematic view of a surface modifying device.

Briefly explaining the surface modifying device, as shown in FIG. 7, a surface modifying device 201 is constituted by including a treating chamber (treating tank) 210, a stirring blade 220 as a flying-up means, a rotatable member 230, a driving motor 250, and a controller 260. Here, the treating chamber 210 is used for accommodating an object-to-be-treated containing the toner particles and the external additives. Further, the stirring blade 220 is provided rotatably at a bottom of the treating chamber 210 positioned below the rotatable member 230 in the treating chamber 210. The rotatable member 230 is provided rotatably above the stirring blade 220. The treating chamber 210 is a cylindrical container having a substantially flat bottom portion and is provided with a driving shaft 211 to which the stirring blade 220 and the rotatable member 230 are mounted at a substantially center of the bottom portion. The stirring blade 220 is constituted so as to be capable of flying up the object-to-be-treated containing the toner particles and the external additives in the treating chamber 210 by being rotated. The stirring blade 220 includes a blade portion 221 extending from a rotation center thereof toward an outside (outside with respect to a radial direction (outer diameter direction), outer diameter side) and has a shape such that a free end of the blade portion 221 is raised so as to fly up the object-to-be-treated. By rotation of the stirring blade 220, the object-to-be-treated is flied up while being rotated in the same direction as a rotational direction of the stirring blade 220 in the treating chamber 210, and then is dropped by gravity. Thus, the object-to-be-treated is uniformly mixed. The rotatable member 230 is constituted by a rotatable member main body and a treating portion having a treating surface for treating the object-to-be-treated by collision with the object-to-be-treated by rotation of the rotatable member 230. By the rotation of the rotatable member 230, the object-to-be-treated and the treating surface collide with each other, whereby pulverizing treatment of the external additive aggregate is performed.

<Initially Filled Toner and Supply Toner>

As described above, the lubricant particles 45*c* opposite in polarity to the toner particles 45*a* are liable to move in a direction opposite to a movement direction of the toner particles 45*a* in the developing device 4. For that reason, fusion of the lubricant particles 45*c* toward the developing blade 46 occurs in some instances. Particularly, in the case of a constitution in which the toner T is supplied from the toner cartridge 9 to the developing device 4, when the toner cartridge 9 is repetitively exchanged to a single developing device 4, many lubricant particles 45*c* are supplied to the developing blade 46. As a result, fusion of the lubricant particles 45*c* toward the developing blade 46 is liable to occur. When a lump of the lubricant particles 45*c* fused on the developing blade 46 grows, a toner coat on the developing roller 43 is disordered, so that there is a possibility that an image defect in a vertical stripe shape (stripe shape extending in a direction along a surface movement direction of the developing roller 43) (hereinafter, this image defect is also referred to as a "development stripe") occurs. As a result, there is a possibility that the image defect becomes a factor which hinders lifetime extension of the developing device 4 and the process cartridge 10.

Therefore, in this embodiment, an external addition amount of the positively chargeable lubricant particles 45*c* to the toner particles 45*a* of the supply toner T' accommodated in the toner cartridge 9 is made smaller than an external addition amount of the positively chargeable lubricant particles 45*c* to the toner particles 45*a* of the initially filled toner T filled in advance in the new developing device 4 (process cartridge 10). Incidentally, the external addition amount of the positively chargeable lubricant particles 45*c* to the toner particles 45*a* can be expressed by the weight % of the positively chargeable lubricant particles 45*c* to the total weight of the toner particles 45*a*. The external addition amount of the positively chargeable lubricant particles 45*c* to the toner particles 45*a* of the supply toner T' accommodated in the toner cartridge 9 may be 0 weight % (i.e., the positively chargeable particles 45*c* may also be not externally added to the toner particles 45*a* of the supply toner T').

By this, in a constitution in which the toner cartridge 9 is exchangeable by being demounted from and mounted to the developing device 4, fusion of the lubricant particles 45*c* onto the developing blade 46 can be suppressed.

<Evaluation Experiment>

An evaluation experiment for confirming an effect of this embodiment was conducted for embodiments (embodiments 1 and 2) according to this embodiment and comparison examples (comparison examples 1 and 2) was conducted.

The process cartridge 10 and the toner cartridge 9 which have the constitutions of this embodiment were used. The initially filled toner T to be filled in the developing device 4 of the process cartridge 10 and the supply toner T' to be accommodated in the toner cartridge 9 were prepared by using the above-described Henschel mixer (manufactured by NIPPON COKE & ENGINEERING CO., LTD.) as the surface modifying device. In a table 1, addition amounts of external additives (silica particles 45*b* and positively chargeable lubricant particles 45*c*), and a rotational speed of a blade free end and blade rotation time of the surface modifying device, which are external addition conditions are shown. First, silica particles (small silica particles) 45*b* were added to the toner particles 45*a* and were treated by the surface modifying device at the blade free end peripheral speed for the time which are shown in the table 1. Then, as shown in the table 1, silica particles (large silica particles) 45*b* and the positively chargeable lubricant particles 45*c* (in the case of addition) were added and then were treated by the surface modifying device at the blade free end peripheral speed for the time which are shown in the table 1. In this case, as shown in the table 1, as the initially filled toner T, P-1 and P-2 were prepared, and the supply toner T', T-1, T-2, and T-3 were prepared.

Further, in a table 2, combinations of the initially filled toner T (P-1, P-2) and the supply toner T' (T-1, T-2, T-3) which are used in associated embodiments (embodiments 1 and 2) are comparison examples (comparison examples 1 and 2) are shown. Incidentally, in either one of the embodiments and the comparison examples, the toner particles 45*a* used, the silica particles 45*b* used, and the lubricant particles 45*c* used were the same. Specifically, as the toner particles 45*a*, non-magnetic toner particles (weight-average particle size: 7 μm) prepared by the suspension polymerization method were used. Further, as the silica particles 45*b*, monodisperse and spherical sol-gel silica particles (two kinds of silica particles different in primary particle size) were used. Further, as the positively chargeable lubricant particles 45*c*, zinc stearate particles (average particle size: 1 μm) were used.

TABLE 1

| | | FIRST STAGE | | | | SECOND STAGE | | | | | |
|---|---|---|---|---|---|---|---|---|---|---|---|
| | | SP*1 | | | | SP*1 | | LP*5 | | | |
| | | PPS*2 | EAA*3 (wt. %) | PS*4 (m/s) | TIME (sec) | PPS*2 | EAA*3 (wt. %) | KIND | EAA*3 (wt. %) | PS*4 (m/s) | TIME (sec) |
| PROCESS | P-1 | 10 | 0.5 | 40 | 300 | 80 | 0.5 | ZS*6 | 0.3 | 40 | 300 |
| CARTRIDGE | P-2 | 10 | 0.5 | 40 | 300 | 80 | 0.5 | ZS*6 | 0 | 40 | 300 |
| TONER | T-1 | 10 | 0.5 | 40 | 300 | 80 | 0.5 | ZS*6 | 0.1 | 40 | 300 |
| CATRIDGE | T-2 | 10 | 0.5 | 40 | 300 | 80 | 0.5 | ZS*6 | 0 | 40 | 300 |
| | T-3 | 10 | 0.5 | 40 | 300 | 80 | 0.5 | ZS*6 | 0.3 | 40 | 300 |

*1"SFP" is silica particles.
*2"PPS" is primary particle size.
*3"EAA" is external addition amount.
*4"PS" is peripheral speed.
*5"LP" is lubricant particles.
*6"ZS" is zinc stearate.

TABLE 2

| | PROCESS CARTRIDGE | TONER CARTRIDGE |
|---|---|---|
| EMB. 1 | P-1 | T-1 |
| EMB. 2 | P-1 | T-2 |
| COMP. EX. 1 | P-1 | T-3 |
| COMP. EX. 2 | P-2 | T-1 |

In a new process cartridge 10, as an initial filling amount, 150 g of the initially filled toner T is filled, and in a new toner cartridge 9, 600 g of the supply toner T' is filled. The process cartridge 10 and the toner cartridge 9 which have each of the combinations of the initially filled toner T and the supply toner T' which are shown in the table 2 were mounted in the image forming apparatus 100, and then the image forming apparatus 100 carried out printing up to 100K (100,000) sheets. The printing was performed by adjusting a print ratio so as to show progression of the toner amount in the toner cartridge 9 for a printed sheet number shown in FIG. 5. Further, a torque exerted on a driving source of the photosensitive drum 1 when the printing was performed in the above-described condition (herein, this torque is also referred to as a "drum torque") was measured. The drum torque was measured on the basis of information showing a relationship, acquired in advance, between a driving current flowing through the driving source and the drum torque. In FIG. 6, progression of the drum torque for the printed sheet number is shown. Further, in a table 3, an evaluation result of an occurrence status of the development stripe (occurrence status of fusion of the lubricant particles 45*c* onto the developing blade 46) and an occurrence status of contamination of the charging roller 2 in each of the embodiments and the comparison examples is shown.

TABLE 3

| | DSOT*[1] | CRC*[2] |
|---|---|---|
| EMB. 1 | SLIGHT | NO(1) |
| EMB. 2 | NO | NO(2) |
| COMP. EX. 1 | 1 STRIPE | STRIPE |
| COMP. EX. 2 | — | — |

*[1]"DSOT" is a development stripe occurrence timing.
"SLIGHT" means that no development stripe occurred on an image even after printing of 100K sheets and that slight fusion occurred on the developing blade.
"NO" means that no development stripe occurred on the image even after the printing of 100K sheets and that no fusion occurred on the developing blade.
"STRIPE" means that the development stripe occurred on the image after the printing of about 40K sheets.
"—" means that the printing become impossible.
*[2]"CRC" is charging roller contamination.
"NO(1)" means that there is no problem on an image.
"NO(2)" means that there is no problem on the image and that external additive contamination occurred on a charging roller surface.
"STRIPE" means that stripe contamination occurred due to fog resulting from the development stripe.
"—" means that the printing become impossible.

Figure 5:
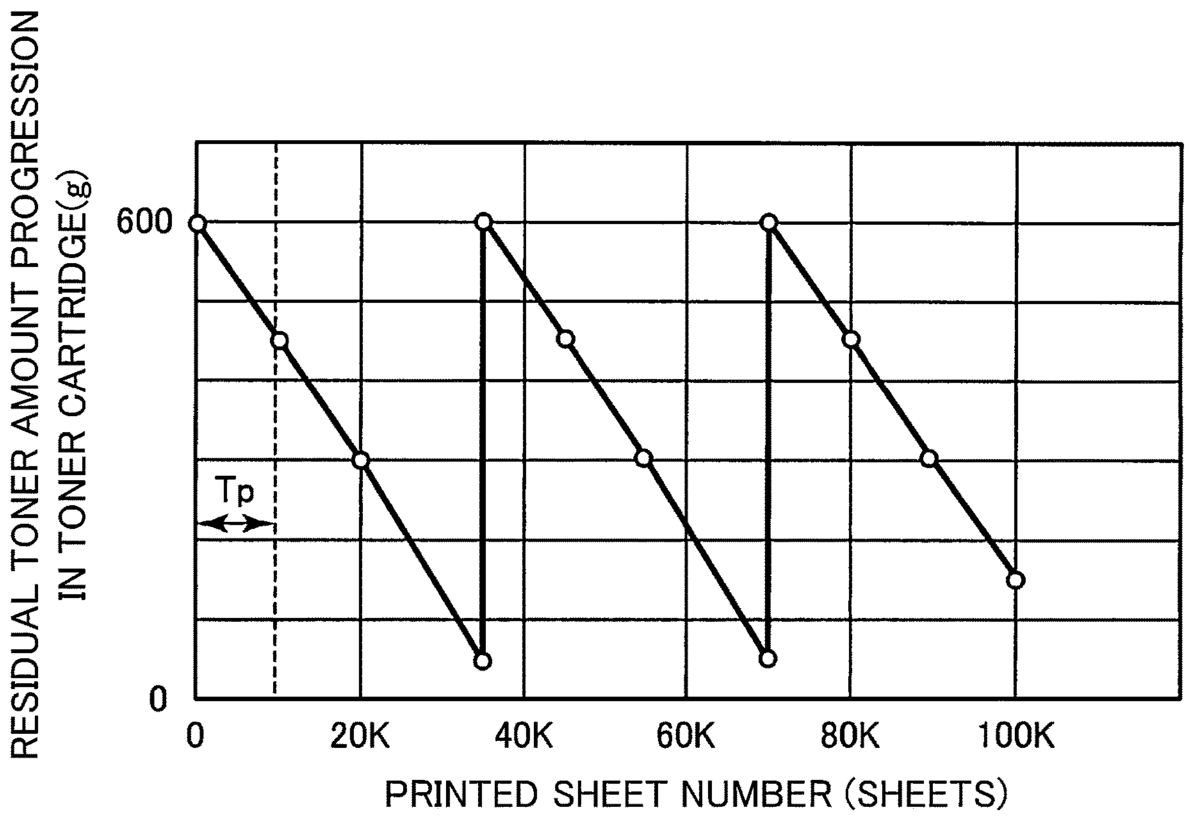
FIG. 5 is a graph showing a progression of an amount of toner in the toner cartridge is an evaluation experiment.
Figure 6:
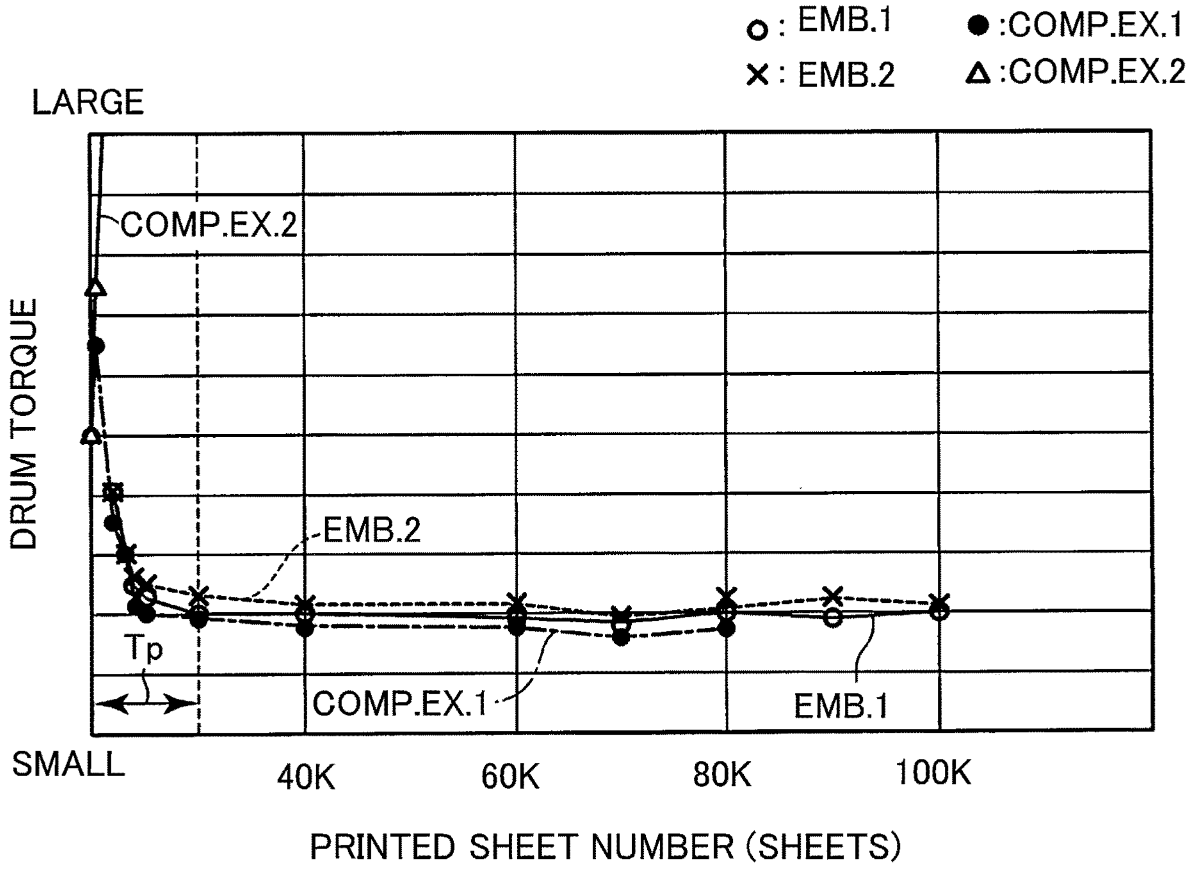
FIG. 6 is a graph showing a progression of a drum torque in the evaluation experiment.

As shown in FIG. 5, three toner cartridges 9 were used until the printing is continued up to 100K sheets. As shown in FIG. 6, in the embodiments 1 and 2 and the comparison example 1, the drum torque was sufficiently lowered and became a stable state until a period (Tp in FIG. 6) in which the toner T in an amount corresponding to an amount of the toner first filled in the process cartridge 10 was used has elapsed. This would be considered because a friction coefficient of the surface of the photosensitive drum 1 is lowered by minute flaws generated on the surface of the photosensitive drum 1 by paper and the silica particles 45*b* during supply of the positively chargeable lubricant particles 45*c* to the cleaning member 63 by carrying out the printing to some extent. On the other hand, in the comparison example 2, the positively chargeable lubricant particles 45*c* were not contained in the initially filled toner T (P-2), and therefore, the drum torque was increased from immediately after the printing experiment, so that the printing became impossible due to abnormality of the drum torque before the period Tp has elapsed.

Further, in the embodiments 1 and 2, it was able to be confirmed that surface contamination of the charging roller 2 which is problematic on the image did not occur even when the printing of 100K sheets was carried out and thus that the charging roller 2 is in a sufficiently usable state. On the other hand, in the comparison example 1, the surface of the charging roller 2 was contaminated in a stripe shape (stripe shape extending in the direction along the surface movement direction of the charging roller 2), so that a stripe-shaped contamination occurred on the image due to charging failure (charging non-uniformity) of the surface of the photosensitive drum 1. This would be considered because a fog (phenomenon such that the toner T with an insufficient charge amount is deposited on a non-image portion of the surface of the photosensitive drum 1) due to occurrence of the development stripe described later (fusion of the lubricant particles 45*c* onto the developing blade 46) occurred.

Further, when the development stripe occurrence timing was checked, in the comparison example 1, the development stripe occurred on the image from about 40K sheets. On the other hand, in the embodiments 1 and 2, the development stripe did not occur on the image up to 100K sheets. Further, when the process cartridge 10 was disassembled and a sliding friction portion of the developing blade 46 with the developing roller 43 was checked, in the embodiment 1, the fusion of the lubricant particles 45*c* slightly occurred, but in the embodiment 2, the fusion of the lubricant particles 45*c* could not be hardly observed. However, in the embodiment 2, the positively chargeable lubricant particles 45*c* were not contained in the supply toner T' (T-2), and therefore, although not at a problematic level on the image, the contamination with the external additive on the surface of the charging roller 2, which would be considered to occur due to a deterioration of the cleaning member 63 was observed.

Thus, the external addition amount of the positively chargeable lubricant particles 45*c* to the toner particles 45*a* of the supply toner T' accommodated in the toner particles is made smaller than the external addition amount of the positively chargeable lubricant particles 45*c* to the toner particles 45*a* of the initially filled toner T filled in advance to the new developing device 4 (process cartridge 10). By this, it is possible to suppress the fusion of the lubricant particles 45*c* onto the developing blade 46 while suppressing the deterioration of the cleaning member 63.

The external addition amount of the positively chargeable lubricant particles 45*c* to the toner particles 45*a* of the supply toner T' accommodated in the toner cartridge 9 can be appropriately adjusted depending on constitutions of the developing device 4 and the drum unit 11. The external addition amount of the positively chargeable lubricant particles 45*c* to the toner particles 45*a* of the initially filled toner T may preferably be an amount such that even in the case where the supply toner T' does not contain the positively chargeable lubricant particles 45*c*, the drum torque is sufficiently lowered and becomes a stable state until the toner in an amount corresponding to a predetermined amount of the initially filled toner T is consumed. By this, even when the positively chargeable lubricant particles 45*c* are not contained in the supply toner T', the drum torque is sufficiently lowered and becomes the stable state until the toner T in the amount corresponding to the predetermined amount of the initially filled toner T is consumed, so that subsequent supply of the positively chargeable lubricant particles 45*c* becomes substantially unnecessary. However, in order to stabilize the drum torque for a long term in a sufficiently lowered state, in a range in which fusion of the lubricant particles 45*c* onto the developing blade 46 can be sufficiently suppressed, the positively chargeable lubricant particles 45*c* may preferably be contained in the supply toner T' in some cases. For example, in the constitution of this embodiment, the external addition amount (weight %) of the positively chargeable lubricant particles 45*c* in the supply toner T' may preferably be more than 0 weight % and not more than about ½ of the external addition amount (weight %) of the positively chargeable lubricant particles 45*c* in the initially filled toner T, more preferably be not more than about ⅓ of the external addition amount of the positively chargeable lubricant particles 45*c*.

Thus, in this embodiment, the image forming apparatus a rotatable image bearing member (photosensitive drum) 1; a charging means (charging roller) 2 configured to electrically charge a surface of the image bearing member 1; a developing device 4 configured to form a developer image by supplying a developer T to the surface of the image bearing member 1 charged by the charging means 2, the developing device 4 including a rotatable developing member (developing roller) 43 configured to convey the developer T toward the image bearing member while carrying the developer T, a regulating member (developing blade) 46 configured to regulate an amount of the developer T on the developing member 43 in contact with the developing member 43, and an accommodating portion 42 configured to accommodate the developer T supplied to the developing member 43; a cleaning member 63 configured to remove the developer T from the surface of the image bearing member 1 in contact with the image bearing member 1; and a supply container 9 which is a supply container (toner cartridge) 9 detachably mountable to the developing device 4 and configured to accommodate the developer T supplied to the accommodating portion 42 of the developing device 4, the supply container 9 being capable of being demounted from the developing device 4 after the developer T is supplied from the supply container 9 to the accommodating portion 42 of the developing device 4 and then being exchanged. In the accommodating portion 42 of a new developing device 4, an initial developer T which is the developer in a predetermined amount is filled in advance. The initial developer T contains toner particles 45*a* of which charge polarity is a predetermined polarity, and to the toner particles 45*a* of the initial developer T, lubricant particles 45*c* of a polarity opposite in charge polarity to the predetermined polarity are externally added. A supply developer T' which is the developer accommodated in the supply container 9 contains the toner particles, and an external addition amount of the lubricant particles 45*c* to the toner particles 45*a* in the supply developer T is smaller than an external addition amount of the lubricant particles 45*c* to the toner particles 45*a* in the initial developer T. Here, to the toner particles 45*a* of the supply developer T', the lubricant particles 45*c* are not externally added. In this embodiment, the lubricant particles 45*c* are particles of a fatty acid metal salt. Further, in this embodiment, the image bearing member 1 includes a protective layer as an outermost surface layer. In this embodiment, the protective layer is formed with an acrylic resin. Further, in this embodiment, an amount of the supply developer T' accommodated in a new supply container 9 is larger than the predetermined amount of the initial developer T. Further, in this embodiment, in the image forming apparatus 100, a unit (process cartridge) 10 including the image bearing member 1 and the developing device 4 is detachably mountable to the image forming apparatus.

As described above, according to this embodiment, for example, in a constitution in which a photosensitive drum 1 with a long lifetime is used, it is possible to compatibly realize reduction in initial drum torque and suppression of the fusion of the lubricant particles 45*c* onto the developing blade 46. By this, the development stripe or the like due to the fusion of the lubricant particles 45*c* onto the developing blade 46 can be suppressed while suppressing the contamination or the like of the charging roller 2 due to the deterioration of the cleaning member 63 for a long term. Thus, according to this embodiment, in a constitution in which the supply container accommodating the toner supplied to the developing device is exchangeable by being demounted from and mounted to the developing device, it is possible to suppress the fusion of the lubricant particles onto the regulating member.

In the above, the present invention was described based on the specific embodiments, but the present invention is not limited to the above-described embodiment.

Further, the image forming apparatus to which the present invention is applicable is not limited to the image forming apparatuses having basic constitutions shown in the above-described embodiments. For example, the present invention is also applicable to an image forming apparatus which includes a plurality of process cartridges detachably mountable thereto and in which a full-color image and the like are capable of being formed by transferring toner images of a plurality of colors onto a recording material with use of an intermediary transfer member such as an intermediary transfer belt. Further, in the above-described embodiments, the image forming apparatus had a constitution to which the process cartridge is detachably mountable. However, the present invention is not limited thereto, and the present invention is also applicable to an image forming apparatus in which a process unit similar to members constituting the process cartridge in the above-described embodiments is provided in an apparatus main assembly. Further, the developing device may also be detachably mountable to the apparatus main assembly substantially singly. Incidentally, examples of the image forming apparatus include a copying machine, a printer (laser beam printer, LED printer, or the like), a facsimile machine, a word processor, a multi-function machine (multi-function printer or the like) of these machines, and the like.

Further, in the above-described embodiments, the developing device employs the contact development type in which the image bearing member and a developer carrying member are disposed in contact with each other, but the present invention is not limited thereto. The developing device may also employ a two-component development type using a two-component developer or a non-contact development type in which the image bearing member and the developer carrying member are disposed opposed to each other with a predetermined gap. That is, the developer is not limited to the above-described non-magnetic one-component developer, but may also be a two-component developer or a magnetic one-component developer.

Further, at least one of the initially filled toner and the supply toner may contain lubricant particles of the same charge polarity (negative polarity in the above-described embodiment) as the charge polarity of the toner particles. That is, for the purpose of further reducing the frictional force between the photosensitive member and the cleaning member, the lubricant particles of the same polarity as the charge polarity of the toner particles are externally added to the toner particles so that the lubricant particles are deposited on the print portion (image portion) of the surface of the photosensitive member. As the negatively chargeable lubricant particles, it is possible to cite, for example, fluorine-containing particles, silicone resin particles, in organic particles, wax resin particles, and the like.

As the fluorine-containing resin particles, it is possible to cite, for example, particles of polytetrafluoroethylene (PTFE, "tetrafluoroethylene resin"), perfluoroalkoxy resin, polychlorotrifluoroethylene, polyvinylidene fluoride, polydichlorodifluoroethylene, tetrafluoroethylene-perfluoroalkylvinyl ether copolymer, tetrafluoroethylene-ethylene copolymer, tetrafluoroethylene-hexafluoropropylene-perfluoroalkylvinyl ether copolymer, tetrafluoroethylene-perfluoroalkoxyethylene copolymer, and the like. Of these, polytetrafluoroethylene (PTFE) is preferred. The external addition amount thereof, to the toner particles, with the same charge polarity (negative polarity in the above-described embodiment) as the charge polarity of the toner particles may be the same or different for between the initially filled toner and the supply toner. When the external addition amount (weight %) of the lubricant particles to the toner particles of the opposite charge polarity (positive polarity in the above-described embodiment) to the charge polarity of the toner particles is smaller for the supply toner than for the initially filled toner, an effect similar to the effect of the above-described embodiment can be obtained.

According to the present invention, in the constitution in which the toner supply container accommodating the toner supplied to the developing device is exchangeable by being demounted from and mounted to the developing device, it is possible to suppress the fusion of the lubricant particles onto the regulating member provided in the developing device.

Subsequently, another embodiment will be described.

Figure 8:
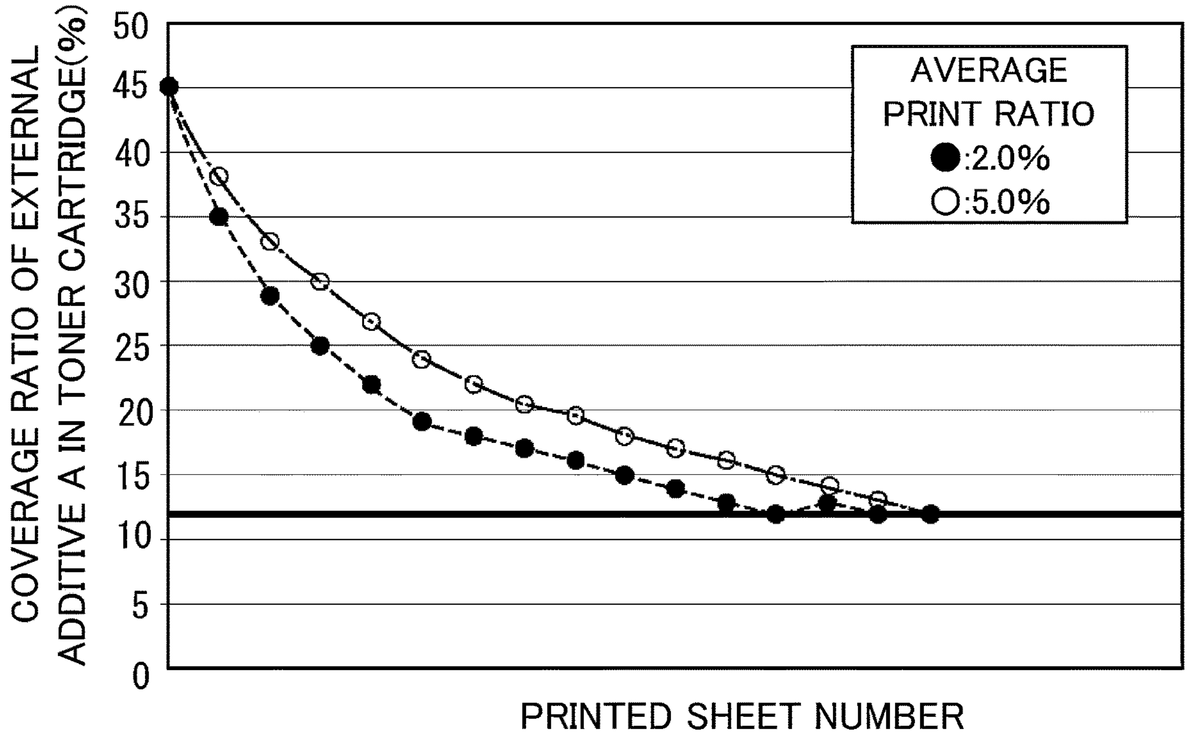
FIG. 8 is a schematic view of a progression of a coverage ratio of an external additive A in the process cartridge.

In FIG. 8, progression of a coverage ratio of the silica particle 45*b*, as an external additive A which is a first external additive in this embodiment, to the initially filled toner T depending on a printed sheet number is shown. In FIG. 8, the ordinate represents the coverage ratio of the silica particles 45*b* to the initially filled toner T, and the abscissa represents the printed sheet number. Here, the printed sheet number also correlates to a rotation number of the developing roller 43 and a toner consumption amount of the filled toner T. In FIG. 8, a black circle shows the case where the printing is made at an average print ratio of 2.0%, and white circle shows the case where the printing is made at an average print ratio of 5.0%. In either case, it is understood that with an increasing printed sheet number, the coverage ratio of the silica particles 45*b* to the initially filled toner T gradually lowers. This is because by the influences such as stirring in the developing device 4, shearing at a conveying portion, and sliding friction with the developing blade 46 for regulating a layer thickness of the developing roller 43, the silica particles 45*b* existing on the surface of the initially filled toner T are gradually embedded in the surface of the initially filled toner T. Here, a decrease in coverage ratio is more conspicuous in the case of the average print ratio of 2.0% than in the case of the average print ratio of 5.0%. This is due to that when the average print ratio is high, consumption of the toner T is quick, so that stress on the toner T is small. Further, a decrease ratio of an initial coverage ratio is high, and a subsequent coverage ratio converges gently. In this embodiment, the coverage ratio of the silica particles 45*b* to the initially filled toner T was 45%. From that state, when the printed sheet number is increased at the average print ratio of 2.0%, the coverage ratio of the silica particles 45*b* to the initially filled toner T converged at 12%.

Figure 9:
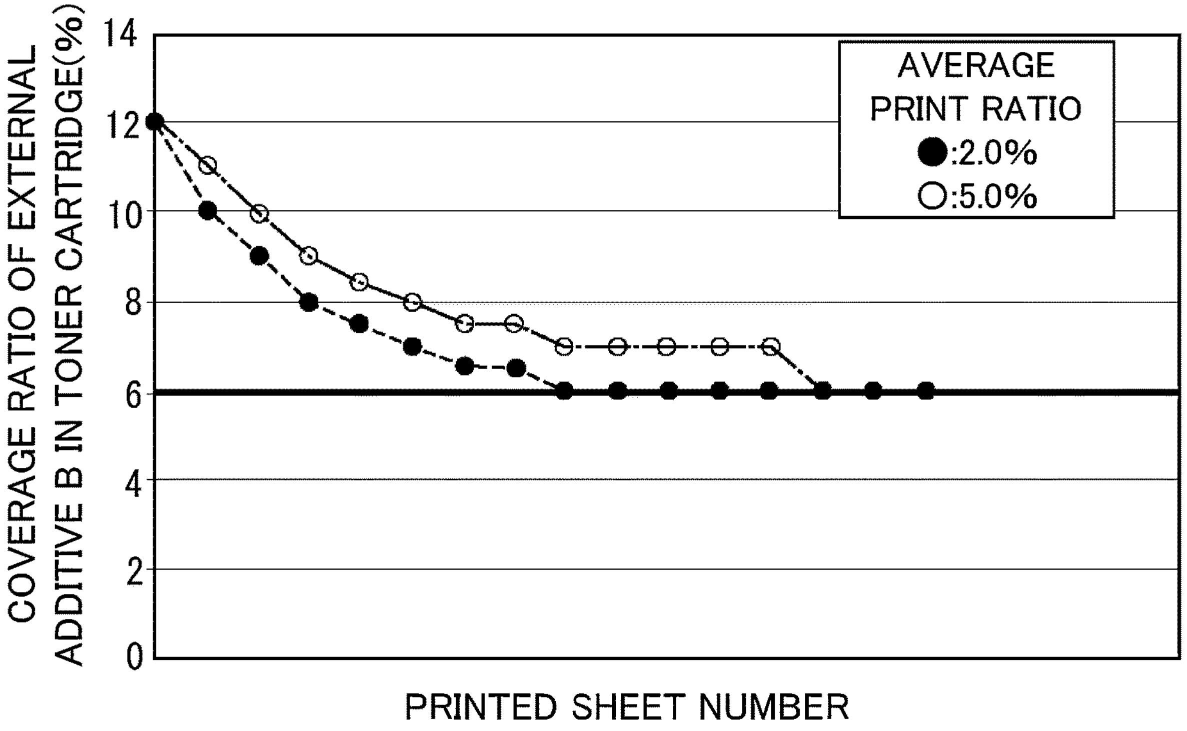
FIG. 9 is a schematic view of a progression of a coverage ratio of an external additive b in the process cartridge.

In FIG. 9, progression of a coverage ratio of zinc stearate, as an external additive B which is a second external additive in this embodiment, to the initially filled toner T depending on the printed sheet number is shown. In FIG. 9, the ordinate represents the coverage ratio of the zinc stearate to the initially filled toner T, and the abscissa represents the printed sheet number. It is understood that with an increasing printed sheet number, the coverage ratio of the zinc stearate to the initially filled toner T gradually lowers. This is because similarly as description with respect to FIG. 8, by the influences such as the stirring in the developing device 4, the shearing at the conveying portion, and the sliding friction with the developing blade 46 for regulating the layer thickness of the developing roller 43, the zinc stearate existing on the surface of the initially filled toner T are gradually embedded in the surface of the initially filled toner T.

Further, a decrease ratio of an initial coverage ratio is high, and a subsequent coverage ratio converges gently. In this embodiment, the coverage ratio of the zinc stearate to the initially filled toner was 12%. From that state, when the printed sheet number is increased at the average print ratio of 2.0%, the coverage ratio of the zinc stearate converged at 6%.

Therefore, in this embodiment, a constitution is employed so that a difference in physical property is surely decreased and thus a fog and density non-uniformity can be suppressed by putting the toner T' supplied from the toner cartridge 9 in a surface state of the same level as a predetermined number of times of friction. In this embodiment, an external additive coverage ratio of the silica particles 45*b* to the toner particles 45*a* of the supply toner T' of the toner cartridge 9 is made smaller than an external additive coverage ratio of the silica particles 45*b* to the toner particles 45*a* of the initially filled toner T of the new process cartridge 10. Further, an external additive coverage ratio of the lubricant particles 45*c* to the toner particles 45*a* of the supply toner T' of the toner cartridge 9 is made smaller than an external additive coverage ratio of the lubricant particles 45*c* to the toner particles 45*a* of the initially filled toner T of the new process cartridge 10. The external addition amount of the lubricant particles 45*c* to the toner particles 45*a* of the supply toner T' accommodated in the toner cartridge 9 may be 0 weight % (i.e., the particles 45*c* may also be not externally added to the toner particles 45*a* of the supply toner T'). In a constitution in which the toner cartridge 9 is exchangeable by being demounted from and mounted to the developing device 4, an image defect can be suppressed by reducing a difference in physical property between the initially filled toner T as an initial developer existing in the developing device 4 and the toner T' as a supply developer in the toner cartridge 9 in the constitution in which the toner cartridge 9 is exchangeable by being demounted from and mounted to the developing device 4.

<Evaluation Result>

An evaluation experiment for confirming an effect of this embodiment was conducted for an embodiment (embodiment 3) according to this embodiment and comparison examples (comparison examples 3, 4 and 5) was conducted.

In a table 4, a mixing condition of the toner particles filled in the process cartridge 10 and the toner cartridge 9, a preparation condition of an addition amount, and a measurement result of each of the external additive A and the external additive B to the prepared toner particles 45*a*. Amounts of the silica particles and the zinc stearate externally added to the toner T and the toner T' filled in the process cartridge 10 and the toner cartridge 9 were made the same in each case.

The amount of the silica particles which are the first external additive contained in the initial developer T is I1, and the amount of the silica particles which are the first external additive contained in the supply developer T' is H1. Further, when the amount of the zinc stearate which is the second external additive contained in the initial developer T is I2, and the amount of the zinc stearate which is the second external additive contained in the supply developer T' is H2, the amounts of the external additives were determined so as to satisfy: 0.9<H1/I1<1.1 and 0.9<H2/I2<1.1. It is further preferable that 0.95<H1/I1<1.05 and 0.95<H2/I2<1.05. These ranges are determined in consideration of a variation in amount of the external additive, and H1/I1 and H2/I2 may preferably be a value close to 1. However, when these ratios (values) fall within the above-described ranges, an effect of this embodiment can be obtained.

additives A and B in the same condition as the toner T for the process cartridge 10 was used.

Specifically, the coverage ratio of the external additive A was adjusted to 45%, and the coverage ratio of the external additive B was adjusted to 12%. For the toner cartridge 2, toner T' adjusted so that the coverage ratio of the external additive A is 12% smaller than 45% and so that the coverage ratio of the external additive B is 6% smaller than 12% was used. This adjustment was made by increasing a rotation speed of the blade free end of the surface modifying device and a blade rotation time when compared with those in an adjusting condition for the toner used in each of the process cartridge 10 and the toner cartridge 1.

Then, the coverage ratios of the external additives A and B were adjusted for each of the toner cartridges 3 and 4 by adjusting the rotation speed of the blade free end of the surface modifying device and the blade rotation time. For the toner cartridge 3, toner T' adjusted so that the coverage ratio of the external additive A is 45% equal to that for the

TABLE 4

| | FIRST STAGE | | | | SECOND STAGE | | | | INITIAL | |
|---|---|---|---|---|---|---|---|---|---|---|
| | SP*3 | | | | LP*7 | | | | COVERAGE RATIO | |
| | SSA*4 | EAA*5 (wt %) | PS*6 (m/s) | TIME (sec) | KIND | EAA*5 (wt %) | PS*6 (m/s) | TIME (sec) | EA*9 A | EA*9 B |
| PC*1 | 24 | 58 | 25 | 300 | ZS*8 | 0.3 | 20 | 300 | 45 | 12 |
| TC*2 1 | 41 | 58 | 25 | 300 | ZS*8 | 0.3 | 20 | 300 | 45 | 12 |
| 2 | 33 | 58 | 40 | 400 | ZS*8 | 0.3 | 30 | 600 | 12 | 6 |
| 3 | 67 | 40 | 25 | 200 | ZS*8 | 0.3 | 30 | 600 | 40 | 6 |
| 4 | 41 | 58 | 40 | 500 | ZS*8 | 0.3 | 20 | 300 | 40 | 40 |

*1"PC" is process cartridge.
*2"TC" is toner cartridge.
*3"SP" is silica particles.
*4"SSA" is specific surface area.
*5"EAA" is external addition amount.
*6"PS" is peripheral speed.
*7"LP" is lubricant particles.
*8"ZS" is zinc stearate.
*9"EA" is externak additive.

For study, the process cartridge 10 and the toner cartridge 9 which have the constitutions of this embodiment were used. The initially filled toner T to be filled in the developing device 4 of the process cartridge 10 and the supply toner T' to be accommodated in the toner cartridge 9 were prepared by using the above-described Henschel mixer (manufactured by NIPPON COKE & ENGINEERING CO., LTD.) as the surface modifying device. In a table 4, addition amounts of external additives (silica particles 45*b* and lubricant particles 45*c*), and a rotational speed of a blade free end and blade rotation time of the surface modifying device 201, which are external addition conditions are shown. First, silica particles (small silica particles) 45*b* were added to the toner particles 45*a* and were treated by the surface modifying device 201 shown in FIG. 7 at the blade free end peripheral speed for the time which are shown in the table 4. Then, as shown in the table 4, the lubricant particles 45*c* were added and then were treated by the surface modifying device at the blade free end peripheral speed for the time which are shown in the table 4. As the lubricant particles 45*c*, the zinc stearate was employed in common. In this embodiment as shown in the table 4, a process cartridge was prepared using the initially filled toner T for the process cartridge 10. Each of toner cartridges 1, 2, 3, and 4 was prepared using the supply toner T' for the toner cartridge 9. For the toner cartridge 1, toner T' coated with the external process cartridge 10 and so that the coverage ratio of the external additive B is 6% smaller than 12% was used. For the toner cartridge 4, toner T' adjusted so that the coverage ratio of the external additive A is 12% smaller than 45% and so that the coverage ratio of the external additive B is 12% equal to that for the process cartridge 10 was used. The reason why as regards the toner cartridges 1 and 3, conditions therefor in a first stage are made different from each other although the coverage ratios of the external additive A therefor are the same is that conditions therefore in a second stage are different from each other. By determining the first stage condition in consideration of the second stage condition, the coverage ratio of the external additive finally externally added to the toner is adjusted.

Here, the toner cartridge 1 corresponds to the comparison example 3, the toner cartridge 2 corresponds to the embodiment 3, the toner cartridge 3 corresponds to the comparison example 4, and the toner cartridge 4 corresponds to the comparison example 5.

In the following, a result obtained in the case where the toner T' for each of the toner cartridges 1, 2, 3, and 4 is supplied to the initially filled toner T in the process cartridge 10 will be described.

As an initial filling amount, 150 g of the initially filled toner T is filled in the new process cartridge 10, and 600 g of the supply toner T' is filled in the new toner cartridge 9.

Of 150 g as the initial filling amount for the process cartridge 10, 100 g of the initially filled toner T was used, and thereafter, the toner cartridge 9 in which the supply toner T' adjusted under the condition of the table 4 was filled is mounted in the image forming apparatus 100. After the toner cartridge 9 is mounted, printing of images on 1000 sheets was carried out while supplying the toner T' from the toner cartridge 9 to the process cartridge 10.

Toner Cartridge 1 (Comparison Example 3)

When the printing operation progresses, the toner in the process cartridge 10 is used, and then the toner T' with a high coverage ratio is supplied little by little from the toner cartridge in a state in which the coverage ratios of the external additives A and B to the toner particles 45*a* lower. In such a state, due to the high coverage ratio of the toner T', the toner T low in coverage ratio and toner charge amount is carried and moved by the toner T' high in toner charge amount, so that the developing roller 43 is coated with the toner T and the toner T'.

By this, a fog due to the toner T and the toner T' which are different in toner charge amount occurred. That is, this fog is a fog with a further lowering in charge amount of the toner by deprivation of the electric charge of the toner with the low charge amount by the toner with the high charge amount. A difference between the toner cartridges 2 and 4 described later is such that a situation in which the toner with the large charge amount in a small amount is supplied to the toner with the small amount in the developing device 4 corresponds to a state rich in the toner with the small charge amount, which is liable to be influenced by the toner with the large charge amount, and therefore, the toner cartridges 2 and 4 are different from each other in that the influence with the difference in charge amount is large for the toner cartridge 4. This is also true for the constitution of the external additive B.

Accordingly, the zinc stearate is steadily supplied from the toner cartridge, and therefore, when the printing of the images on the 1000 sheets, fusion of the zinc stearate onto the developing blade 46 occurred.

Toner Cartridge 3 (Comparison Example 4)

When the printing operation progresses, the toner with the high coverage ratio is supplied little by little from the toner cartridge in the case where the coverage ratio of the external additive A to the toner in the process cartridge 10 lowers. For that reason, a fog due to the toner T and the toner T' different in charge amount occurred similarly as in the comparison example 3.

Toner Cartridge 4 (Comparison Example 5)

When the printing operation progresses, the toner with the high coverage ratio is supplied little by little from the toner cartridge in the case where the coverage ratio of the external additive B to the toner in the process cartridge 10 lowers. The zinc stearate is steadily supplied from the toner cartridge, and therefore, when the printing of the images on the 1000 sheets is carried out, fusion of the zinc stearate onto the developing blade 46 occurred.

Toner Cartridge 2 (Embodiment 3)

As regards both the external additive A and the external additive B, the toner low in coverage ratio of each of the external additive A and the external additive B is supplied to the process cartridge 10. Even when the printing of the images on the 1000 sheets is carried out, the image defect did not occur. The reason why the image defected did not occur would be considered as follows. In the case where the toner T' low in coverage ratio of each of the external additives A and B is supplied little by little to the toner T in a state in which the coverage ratio of each of the external additives A and B is high, the toner which is high in coverage ratio and which is capable of firmly retaining the electric charge exists in a large amount. For that reason, the external additives A and B are coated on the developing roller 43. A difference in phenomenon for the toner cartridge 2 from the above-described toner cartridges 1, 3, and 4 is that in a situation in which the toner with the small charge amount in a small amount is supplied to the toner with the large charge amount, which is not readily influenced and which is accommodated in the developing device 4, a state in which the toner with the large charge amount is rich is formed. For that reason, the toner cartridge 2 is different from the toner cartridges 1, 3, and 4 in that the influence with the difference in charge amount is small. Particularly, in the toner cartridge 2, in addition to use of two kinds of the external additives A and B, the coverage ratio of each of the external additives A and B is appropriately adjusted. Accordingly, the influence of both the external additives A and B can be made small. On the other hand, in the toner cartridge 1, the toner is influenced by both the external additive A and the external additive B. In the toner cartridge 3, the toner is influenced by the external additive A. In the toner cartridge 4, the toner is influenced by the external additive B.

The initially filled toner T in the process cartridge 10 is sufficiently stirred in the process cartridge 10 during use of the toner with the high coverage ratio in a preferential manner, so that the coverage ratio lowers overall. As a result, in the latter half of a durability test, a difference in coverage ratio between the toner and the toner T' supplied from the toner cartridge 9 becomes small, and therefore, it is possible to suppress an occurrence of the fog through a lifetime.

Figure 10:
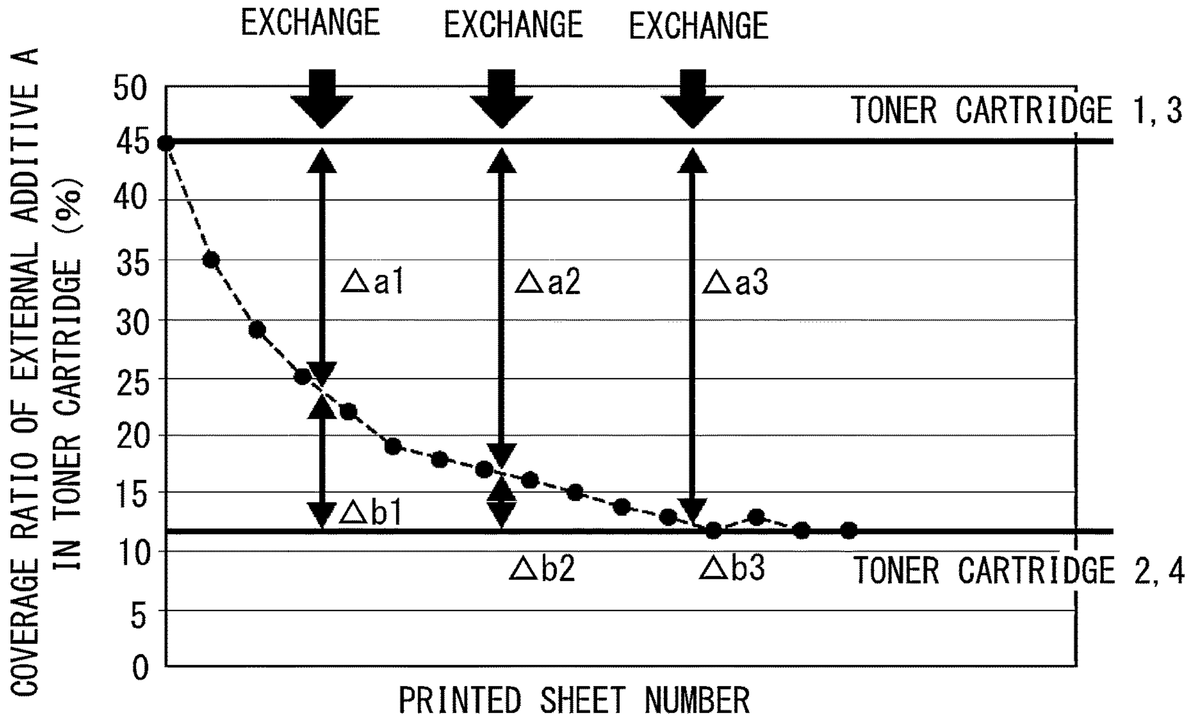
FIG. 10 is a schematic view of a progression of a coverage ratio of the external additive A in the process cartridge.

Here, as shown in FIG. 10, when the toner cartridges 1 and 3 large in amount of the external additive A are exchanged at predetermined timing, a difference between the coverage ratio of the filled toner T contained in the process cartridge 10 and the coverage ratio of the supply toner T' contained in the toner cartridge 9 is taken as $\Delta a\mathbf{1}$, $\Delta a\mathbf{2}$, and $\Delta a\mathbf{3}$. When the toner cartridges 2 and 4 small in amount of the external additive A are exchanged at predetermined timings, a difference between the coverage ratio of the filled toner T contained in the process cartridge 10 and the coverage ratio of the supply toner T' contained in the toner cartridge 9 is taken as $\Delta b\mathbf{1}$, $\Delta b\mathbf{2}$, and $\Delta b\mathbf{3}$. The average print ratio is 2.0%. In that case, $\Delta a\mathbf{1}>\Delta b\mathbf{1}$, $\Delta a\mathbf{2}>\Delta b\mathbf{2}$, and $\Delta a\mathbf{3}>\Delta b\mathbf{3}$ are satisfied. That is, the above-described differences $\Delta b\mathbf{1}$, $\Delta b\mathbf{2}$, and $\Delta b\mathbf{3}$ are small, and therefore, a difference in state between the supply toner T' and the filled toner T when the supply toner T' is supplied is small. Further, $\Delta a\mathbf{1}<\Delta a\mathbf{2}<\Delta a\mathbf{3}$ is satisfied, so that a difference $\Delta a$ becomes larger with an increasing printed sheet number. Accordingly, embedding of the external additive A into the filled toner T progresses.

Figure 11:
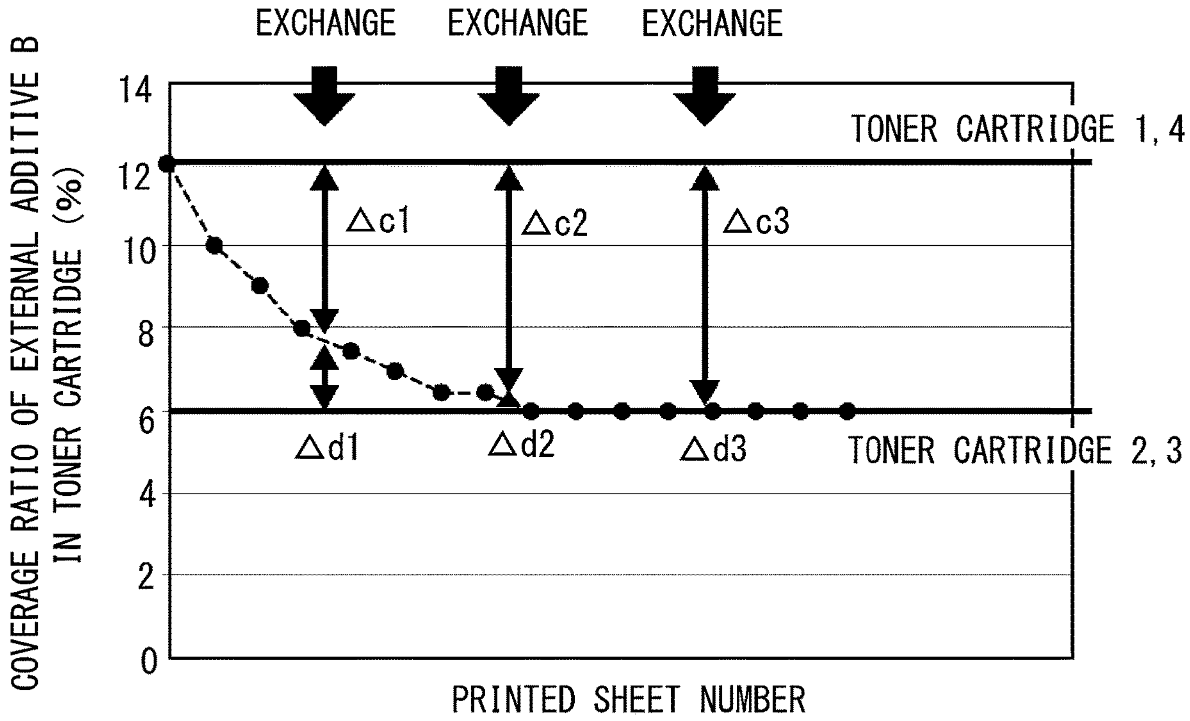
FIG. 11 is a schematic view of a progression of a coverage ratio of the external additive B in the process cartridge.

Further, as shown in FIG. 11, when the toner cartridges 1 and 4 large in amount of the external additive B are exchanged at predetermined timing, a difference between the coverage ratio of the filled toner T contained in the process cartridge 10 and the coverage ratio of the supply toner T' contained in the toner cartridge 9 is taken as $\Delta c\mathbf{1}$, $\Delta c\mathbf{2}$, and $\Delta c\mathbf{3}$. The average print ratio is 2.0%. When the toner cartridges 2 and 3 small in amount of the external additive B are exchanged at predetermined timings, a difference between the coverage ratio of the filled toner T contained in the process cartridge 10 and the coverage ratio of the supply toner T' contained in the toner cartridge 9 is taken as Δd1, Δd2, and Δd3. Then, Δc1>Δd1, Δc2>Δd2, and Δc3>Δd3 are satisfied. That is, the above-described differences Δd1, Δd2, and Δd3 are small, and therefore, a difference in state between the supply toner T' and the filled toner T when the supply toner T' is supplied is small. Further, Δc1<Δc2<Δc3 is satisfied, so that a difference Δc becomes larger with an increasing printed sheet number. Accordingly, embedding of the external additive B into the filled toner T progresses.

As described hereinabove, in the constitution in which the toner cartridge 9 containing two or more kinds of the external additives is detachably mountable to the process cartridge 10 by being demounted from and mounted to the process cartridge 10, the following constitution is preferred. The coverage ratio of each of the external additives to the toner particles 45*a* in the toner cartridge 9 is made equal to or close to the coverage ratio which converges when the printing operation is continued at a minimum print ratio (2.0% in this embodiment), i.e., when the printing is continued at the minimum print ratio until the filled toner T is used up.

Thus, in this embodiment, the image forming apparatus 100 includes the photosensitive drum 1 which is the rotatable image bearing member and the charging roller 2 which is the charging member for charging the surface of the photosensitive drum 1.

The image forming apparatus 100 includes the developing unit 4 for forming the developer image by supplying the developer T to the surface of the photosensitive drum 1 charged by the charging roller 2. The developing unit 4 includes the developing roller 43 which is the rotatable developing member for carrying the developer on the surface thereof, and the accommodating portion 42 for accommodating the developer T supplied to the developing roller 43. The image forming apparatus 100 includes the supply container 9 detachably mountable to the developing unit 4 and capable of accommodating the supply developer T' as the developer T and supplying the supply developer T' to the accommodating portion 42 of the developing unit 4. In the accommodating portion 42 of a new developing unit 4, the initial developer T which is the developer T in a predetermined amount is filled in advance, and each of the initial developer T and the supply developer T' contains at least toner particles 45*a*, the first external additive 45*b*, and the second external additive 45*c*. The amount of the first external additive 45*b* contained in the initial developer T is defined as I1, the amount of the first external additive 45*b* contained in the supply developer T' is defined as H1, the amount of the second external additive 45*c* contained in the initial developer T is defined as I2, the amount of the second external additive 45*c* contained in the supply developer T' is defined as H2. The coverage ratios as measured by ESCA (electron spectroscopy for chemical analysis) are defined as Wpa for the first external additive 45*b* for the initial developer T, Wta for the first external additive 45*b* for the supply developer T', Wpb for the second external additive 45*c* for the initial developer T, and Wtb for the second external additive 45*c* for the supply developer T'. In that case, the following relationships: 0.9<H1/I1<1.1, 0.9<H2/I2<1.1, Wta<Wpa, and Wtb<Wpb are satisfied.

As described above, according to this embodiment, in the constitution in which the supply container 9 accommodating the developer T' supplied to the developing device 4 is mountable to the developing device 4, the image defect with the supply of the developer T' can be suppressed.

Embodiment 4

Basic constitution and operation of an image forming apparatus 100 of an embodiment are similar to those in the embodiment 3. Elements having the same or corresponding functions or constitutions to those in the embodiment 3 will be omitted from detailed description by adding thereto the same reference numerals or symbols.

<Forced Toner Consumption Mode>

Figure 12:
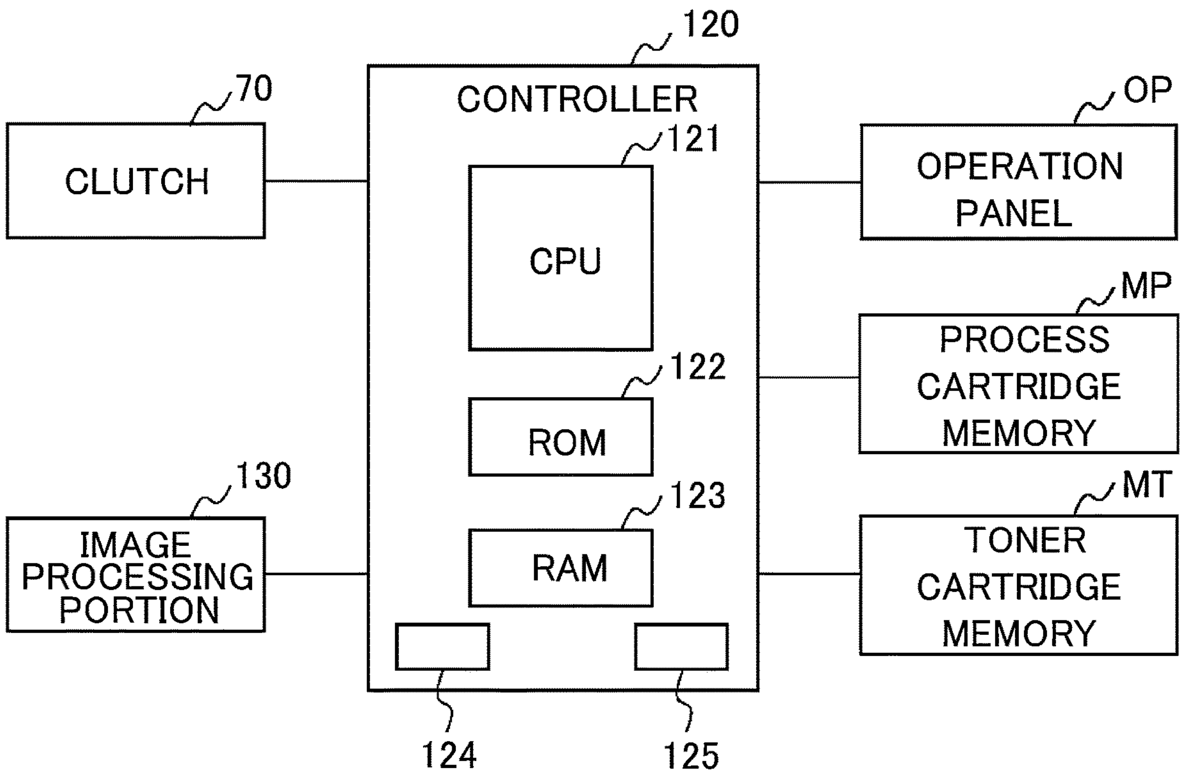
FIG. 12 is a schematic block diagram of a control constitution of the image forming apparatus.

An operation in a forced toner consumption mode as a supplying operation in this embodiment will be specifically described. In the embodiment 4, a constitution of the controller 120 is a constitution shown in FIG. 12.

When image formation is started, image data inputted to the controller 120 is read, and front video count data, an image ratio in the image is calculated by a calculating portion 124 provided in the controller 120 and then is stored in the RAM 123. In the RAM 123, image ratios for images including the image on the last 100 sheets are successively recorded, and then image ratio data for the last 100 sheets are read from the RAM 123 to the controller 120. On the basis of these data, an average print ratio in the last 100 sheets is calculated by an arithmetic operation portion 125. Here, the information stored in the RAM 123 may also be stored in a memory such as the ROM 122 provided in the controller 120, the memory MP provided in the process cartridge 10, or the memory MT provided in the toner cartridge 9. Further, in this embodiment, the average print ratio is calculated every 100 sheets, but the present invention is not limited thereto.

The controller 120 discriminates whether or not on the basis of the print ratio calculated by the calculating portion 124, the average print ratio calculated by the arithmetic operation portion 125 is below a first threshold (2.0% in this embodiment) which is a predetermined value. In the case where the average print ratio is below the first threshold which is the predetermined value, in this embodiment, the toner is consumed so that the average print ratio becomes 2.0%. For that purpose, toner purging is executed during an operation in a sheet interval, as a non-image region, between a trailing end of a current sheet P and a leading end of a subsequent sheet P when continuous image formation is carried out or during a post-rotation operation after the image forming operation. Specifically, an electrostatic latent image is formed in a whole area of the surface of the photosensitive drum 1 with respect to an axial direction of the photosensitive drum 1 while setting a laser light irradiation amount to FFh (maximum value). That is, the toner consumption amount is adjusted by a length of the photosensitive drum 1 with respect to the rotational direction of the photosensitive drum 1, so that an average print ratio which is a sum of an output image and the toner forced by consumed is made 2.0%. This toner consumption amount may be adjusted so that the print ratio of the output image becomes constant as in this embodiment or may also be adjusted so as to become a certain amount. That is, the controller 120 carries out control so that an amount relating to the print ratio is integrated by the arithmetic operation portion 125 and thus the average print ratio per one sheet of the recording material is calculated by the arithmetic operation portion 125. Then, in the case where the average print ratio crosses the first threshold, the controller carries out control so as to perform the supplying operation. That is, in the case where the average print ratio is smaller than the first threshold, the controller carries out control so as to perform the supplying operation.

By carrying out control in such a manner, it is possible to stably control the average print ratio. By that, the coverage ratios of the external additives A and B to the toner T in the process cartridge 10 become close to the coverage ratios of the external additives A and B to the supply toner T'. Accordingly, in the constitution in which the supply container 9 accommodating the developer T' supplied to the developing device 4 is detachably mountable to the developing device 4, it is possible to suppress the image defect with the supply of the developer T'.

Other Embodiments

In the above, the present invention was described on the basis of the specific embodiments, but the present invention is not limited to the above-described embodiments.

In the above-described embodiments, the external additives used are two kinds consisting of the external additives A and B, but are not limited thereto. When an external additive is capable of being subjected to measurement of the coverage ratio, the external additive may be additionally added. For example, a hydrotalcite compound of which element is specified as Mg, Al. In the case of the negative-polarity toner as in this embodiment, compared with the toner particles and the silica fine particles, the hydrotalcite compound has a positive polarity in many instances, so that it would be considered that a depositing force of the hydrotalcite compound acts on both the toner particles and the silica fine particles. For that reason, by interposing the hydrotalcite compound, the external additives are not readily detached from the toner particles, so that it is possible to suppress the fog and to improve the transfer property.

Further, the developing device 4 uses the contact development type in which the photosensitive drum 1 and the developing roller 43 are disposed in contact with each other, but is not limited thereto. The developing device 4 may also use a two-component development type using a two-component developer, and a non-contact development type in which the photosensitive drum 1 and the developing roller 43 are disposed opposed to each other with a predetermined gap therebetween. That is, the developer is not limited to the non-magnetic one-component developer in the above-described embodiments, but may also be the two-component developer and a magnetic one-component developer.

Further, in the memory MT provided to the toner cartridge 9, toner information and control information relating thereto are stored, and it is possible to perform an appropriate operation every toner cartridge 9. Specifically, coverage ratio information of the toner particles 45*a* is calculated from a use status of the process cartridge, and is stored in the memory MP provided to the process cartridge 10 and in the controller 120. Then, in the controller 120, the toner information in the toner cartridge 9 is read, and depending on coverage ratios of the toner particles for the process cartridge 10 and the toner cartridge 9, a particular operation such as execution of forced toner consumption, toner stirring time extension, or the like may be performed. Further, it is also effective that bias control is changed.

Further, the image forming apparatus to which the present invention is applicable is not limited to the image forming apparatuses having basic constitutions shown in the above-described embodiments. For example, the present invention is also applicable to an image forming apparatus which includes a plurality of process cartridges detachably mountable thereto and in which a full-color image and the like are capable of being formed by transferring toner images of a plurality of colors onto a recording material with use of an intermediary transfer member such as an intermediary transfer belt. Further, in the above-described embodiments, the image forming apparatus had a constitution to which the process cartridge is detachably mountable. However, the present invention is not limited thereto, and the present invention is also applicable to an image forming apparatus in which a process unit similar to members constituting the process cartridge in the above-described embodiments is provided in an apparatus main assembly. Further, the developing device may also be detachably mountable to the apparatus main assembly substantially singly. Incidentally, examples of the image forming apparatus include a copying machine, a printer (laser beam printer, LED printer, or the like), a facsimile machine, a word processor, a multi-function machine (multi-function printer or the like) of these machines, and the like.

According to the present invention, in the constitution in which the supply container accommodating the developer supplied to the developing device is mountable to the developing device, it is possible to suppress the image defect with the supply of the developer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Applications Nos. 2023-100406 filed Jun. 19, 2023 and 2023-122709 filed Jul. 27, 2023, which are hereby incorporated by reference herein in their entirety.

What is claimed is:

1. An image forming apparatus comprising:

a rotatable image bearing member;

a charging member configured to electrically charge a surface of the image bearing member;

a developing unit configured to form a developer image by supplying a developer to the surface of the image bearing member charged by the charging member, the developing unit including a rotatable developing member carrying the developer on a surface thereof, and an accommodating portion configured to accommodate the developer supplied to the developing member; and a supply container detachably mountable to the developing unit and capable of accommodating a supply developer as the developer and supplying the supply developer to the accommodating portion of the developing unit, wherein in the accommodating portion of a new developing unit, an initial developer which is the developer in a predetermined amount is filled in advance, wherein each of the initial developer and the supply developer contains at least toner particles, a first external additive, and a second external additive, wherein an amount of the first external additive contained in the initial developer is defined as I1, an amount of the first external additive contained in the supply developer is defined as H1, an amount of the second external additive contained in the initial developer is defined as I2, an amount of the second external additive contained in the supply developer is defined as H2, and coverage ratios as measured by ESCA are defined as Wpa for the first external additive in the initial developer, Wta for the first external additive in the supply developer, Wpb for the second external additive in the initial developer, and Wtb for the second external additive in the supply developer, and wherein following relationships are satisfied:

$$0.9 < H1/I1 < 1.1,\ 0.9 < H2/I2 < 1.1,\ Wta < Wpa, \text{ and } Wtb < Wpb.$$

2. The image forming apparatus according to claim 1, further comprising:

an arithmetic operation portion configured to perform an arithmetic operation of an amount relating to a print ratio of an image formed on a recording material in an image forming operation for forming the image on the recording material in a case that the image forming operation is executed; and a controller configured to control rotation of the image bearing member and the developing member on a basis of the amount subjected to the arithmetic operation by the arithmetic operation portion so that a supplying operation for supplying the developer from the developing member to the surface of the image bearing member is capable of being executed, wherein the controller carries out control so that the amount relating to the print ratio is integrated by the arithmetic operation portion and an average print ratio per one sheet of the recording material is arithmetically operated, and carries out control so as to execute the supplying operation in a case that the average print ratio is smaller than a threshold.

3. The image forming apparatus according to claim 1, wherein the first external additive is silica fine particles.

4. The image forming apparatus according to claim 1, wherein the second external additive is a fatty acid metal salt.

* * * * *